US010140515B1

(12) United States Patent
Waldo

(10) Patent No.: US 10,140,515 B1
(45) Date of Patent: Nov. 27, 2018

(54) IMAGE RECOGNITION AND CLASSIFICATION TECHNIQUES FOR SELECTING IMAGE AND AUDIO DATA

(71) Applicant: A9.com, Inc., Palo Alto, CA (US)

(72) Inventor: Mark Scott Waldo, El Cerrito, CA (US)

(73) Assignee: A9.com, Inc., Palo Alto, CA (US)

( * ) Notice: Subject to any disclaimer, the term of this patent is extended or adjusted under 35 U.S.C. 154(b) by 67 days.

(21) Appl. No.: 15/192,759

(22) Filed: Jun. 24, 2016

(51) Int. Cl.
*G06K 9/00* (2006.01)
*G06N 3/08* (2006.01)
*G06K 9/62* (2006.01)
*G06F 17/30* (2006.01)
*G06F 3/16* (2006.01)

(52) U.S. Cl.
CPC ......... *G06K 9/00684* (2013.01); *G06F 3/165* (2013.01); *G06F 17/30752* (2013.01); *G06F 17/30772* (2013.01); *G06K 9/00268* (2013.01); *G06K 9/6215* (2013.01); *G06N 3/08* (2013.01)

(58) Field of Classification Search
CPC .......... G06K 9/00684; G06K 9/00268; G06K 9/6215; G06N 3/08; G06F 17/30752; G06F 17/30772; G06F 3/165
See application file for complete search history.

(56) References Cited

U.S. PATENT DOCUMENTS

| | | | |
|---|---|---|---|
| 8,171,016 B2* | 5/2012 | Van de Sluis | G06F 17/30749 707/713 |
| 9,830,526 B1* | 11/2017 | Lin | G06K 9/4628 |
| 2007/0038671 A1* | 2/2007 | Holm | G06F 17/30743 |

* cited by examiner

*Primary Examiner* — Bhavesh Mehta
*Assistant Examiner* — Menatoallah Youssef
(74) *Attorney, Agent, or Firm* — Hogan Lovells US LLP

(57) ABSTRACT

A music playlist may be generated based on images selected by a user on a computing device. For example, by using image classification and machine learning, image descriptors may automatically be associated with an image and the assigned image descriptors mapped to music descriptors associated with songs. Songs associated with the mapped music descriptors are identified and assembled in a playlist sent to the user's device. Additional images may be identified, for example based on the image descriptors of the selected images and the music descriptors, to identify images to display during playback of the playlist.

17 Claims, 12 Drawing Sheets

IMAGE RECOGNITION AND CLASSIFICATION TECHNIQUES FOR SELECTING IMAGE AND AUDIO DATA

BACKGROUND

Users are increasingly utilizing electronic devices to take pictures and capture video, as well as listen to music. Often, the images, video, and music are not stored on a user's device, but made available over a network from a server. This allows a user access to virtually all of the images and video she has ever captured, as well as vast amounts of music either owned by the user or available from a music source, such as a streaming service. Such an overwhelming amount of music and pictures can make it time consuming and difficult for a user to decide which music and/or images to view.

BRIEF DESCRIPTION OF THE DRAWINGS

Various embodiments in accordance with the present disclosure will be described with reference to the drawings, in which.

DETAILED DESCRIPTION

Figure 1:
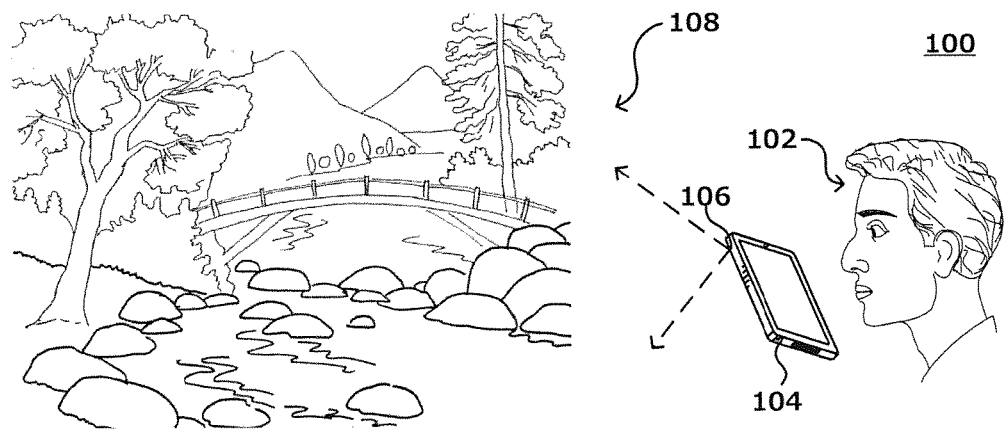
FIG. 1 illustrates an example situation where a user is capturing image data, in accordance with various embodiments.

Systems, devices and methods in accordance with various embodiments of the present disclosure may overcome one or more of the aforementioned and other deficiencies experienced in conventional approaches for automated selection of image data and/or audio data. In particular, various embodiments enable creation of a customized music playlist and/or personalized photograph display, such as by utilizing computer vision approaches leveraging machine learning to perform image identification such as object and/or scene recognition on image data (e.g., a digital image, one or more frames of digital video, etc.) and identifying music that is correlated to aspects of the image data. Images may be identified from a music selection in a similar fashion, such as to display while the music is playing.

For example, a person may be viewing digital images (alternatively referred to herein as pictures, image data, photos, images, etc.) on their phone, and desire to listen to music inspired by one or more of her pictures. The user selects several pictures from her recent vacation to Hawaii and initiates a process to generate a music playlist based on the photos. In various embodiments, the photos may be stored on the device, or may be stored "in the cloud," such that the photos are associated with an account of the user. The photos are analyzed to determine various characteristics, as discussed further herein, potentially including aspects such as regions of interest, object recognition, scene recognition, sentiment, and facial recognition, as well as analyzing data included with the image (e.g., metadata) that indicates various information about the image, such as location data (e.g., Global Positioning System (GPS) data), ambient audio during image generation, songs playing on the device concurrent to capturing the photo, date/time the image was captured, weather (e.g., determined based on the date/time and location), account information of the user (e.g., purchase information, recommendations, etc.), etc.

Based on the analysis, various image descriptors are generated and associated with the selected image(s). In some embodiments, the analysis and image descriptor generation is pre-processed on a server, such as where the selected photos are stored in the cloud. One or more of the image descriptors are then compared to a database of music descriptors in order to determine a correlation (e.g., a mapping) between various image descriptors and music descriptors. For example, a collection of songs (e.g., digital audio) may be analyzed to determine various inherent characteristics (e.g., tempo, mood, happy/sad, etc.) using various techniques known in the art. Other characteristics may be determined for the songs, such as relevant locations mentioned or associated with a song (e.g., "California Girls" is associated with California, "Rocky Mountain High" is associated with the Rocky Mountains, etc.), relevant occasions (e.g., "Happy Birthday" is often associated with birthday parties, "Auld Lang Syne" is often associated with New Year's Eve events, etc.), locations at which the song has been played by other users, events associated with the song (e.g., "Good Vibrations" may be associated with surfing and the ocean, a particular song is played when a certain baseball player is announced to bat at a professional baseball game, etc.), purchase information related to the song, etc.

A correlation between an image descriptor and a music descriptor may be associated with a confidence level, similarity score, or the like, such as might indicate a degree of certainty regarding the match/correlation/mapping. In some embodiments, songs associated with a music descriptor that matches an image descriptor with a similarity score exceeding a certain threshold are selected, and a playlist of songs is generated. In the Hawaii example, the pictures of the user's vacation may be analyzed and image descriptors such as "vacation" and "relaxing" may be correlated to song descriptors "vacation" and "soothing," respectively, with a list of resulting songs having the song descriptors being selected to populate a playlist that is delivered to the user's computing device for playback.

In some embodiments, the selected pictures are then displayed on the user's computing device (or another device such as a connected TV, etc.) during playback of the music playlist. As discussed further herein, the user may be presented with interface elements allowing the user to indicate that the pictures and/or music is a "good match" or a "bad match," thereby allowing data to be delivered to the classification and/or matching system to automatically refine the automated selection/correlation approaches.

In another example, a user may be throwing a celebratory party with members of her workplace. The user selects various photos of people at her workplace, and based on image recognition, scene recognition, and/or activity recognition approaches, among other approaches described herein, various descriptors or similar data are generated that indicate that "party music" is appropriate. Similarly, the user's playback history, purchase history and/or location history may be part of the determination as well, such that previously "upbeat" "party music" is selected for playback. Additionally, various image descriptors such as "cubicles" and "workplace," as well as facial recognition data, location data, social media relationship data, etc. may be analyzed to indicate that a company party is underway, and various pictures of co-workers in the user's photo library (or identified on social networks, etc.) are identified and caused to display along with the music.

By allowing a user to automatically have relevant images and/or music identified based on a selection of certain songs and/or pictures, the user does not have to navigate her entire photo and/or music database in order to manually select appropriate media to play together. Previous approaches to music and/or audio selection lack the ability to access and analyze large amounts of music, photos, and metadata in order to select complementary media. For example, some prior approaches to automated music selection rely upon a user's music library or an online database of songs associated with user preferences, but do not have access to image databases associated with the user, much less a capability to analyze images for relevant descriptors and make automated correlations that are specific to the individual user.

Accordingly, approaches in accordance with various embodiments improve the operation and performance of computing devices, such as those on which they are implemented by reducing computing resources consumed by a user accessing individual songs and/or photos, many of which may be stored remotely, which also saves transmission bandwidth by eliminating a need for the user to manually search her online music and/or image databases. Further, by identifying relevant images and/or songs to play concurrently such that the automated selections meet a correlation threshold (e.g., a similarity score, confidence score, etc.), then fewer songs and/or images may be erroneously selected, resulting in fewer searches on local and online databases, reduced transmission bandwidth (songs and/or images that don't match aren't downloaded, etc.), and the like.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

FIG. 1 illustrates an example situation 100 where a user is capturing image data, in accordance with various embodiments. Although a portable computing device 104 (e.g., a smart phone or tablet computer) is shown, it should be understood that various other types of electronic devices that are capable of determining and processing input can be used as well in accordance with various embodiments. These devices can include, for example, notebook computers, personal data assistants, e-book readers, cellular phones, video gaming consoles or controllers, smart televisions, set top boxes, a wearable computer (e.g., a smart watch or glasses), and portable media players, among others.

In the example 100 of FIG. 1, a user 102 is taking a picture of an outdoor environment 108 using an image capture element 106 of the computing device 104. While a still image is contemplated in this example, the techniques used herein may also be utilized with frames of digital video (live or stored), an image of a physical or digital image, etc.

Figure 2:
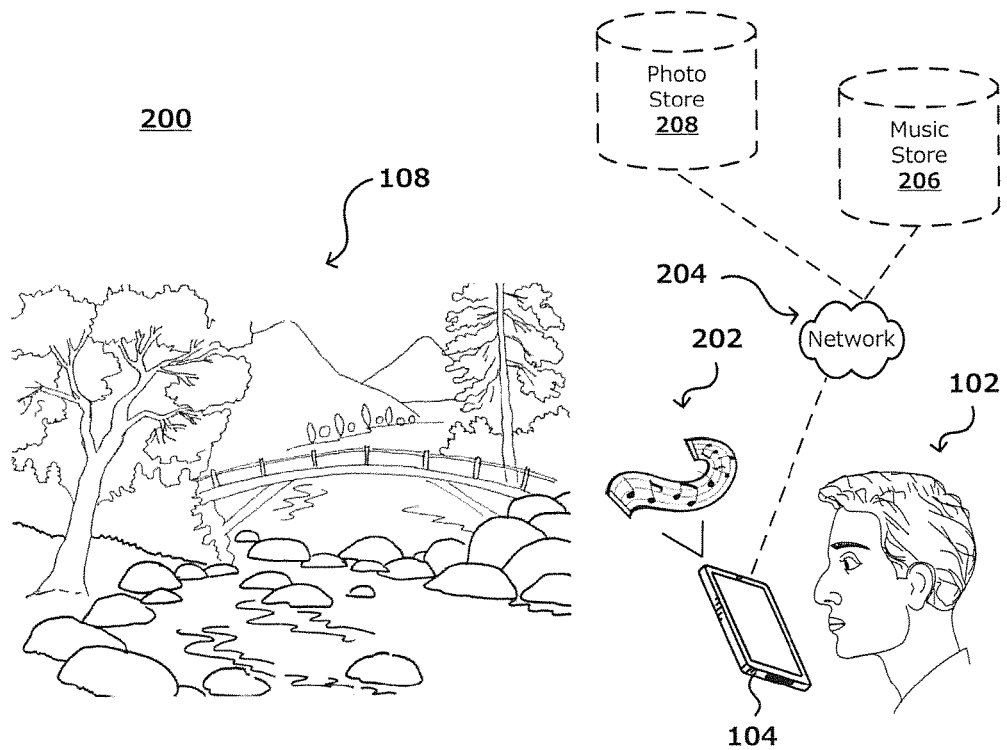
FIG. 2 illustrates an example of allowing a user to capture various input and store data, in accordance with various embodiments.

FIG. 2 illustrates an example 200 of allowing a user to capture various input and store data, in accordance with various embodiments. It should be understood that reference numbers may be carried over between figures for similar components for purposes of explanation, but that such use should not be interpreted as a limitation on the various embodiments. In the example 200 of FIG. 2, the user 102 is playing music 202 on the computing device 104, for example while capturing the image data as illustrated in FIG. 1. For example, the user may be associated with a local music store (i.e., music stored on the device 104) or a remote music store 206, such as may be accessed over a network 204 streaming audio services or remote storage of music belonging the user 102. The image data acquired by the user 102 may be stored on the device, as well as being uploaded via the network 204 to a photo store 208, such as an online repository of digital image data associated with the user 102.

Figure 3A:
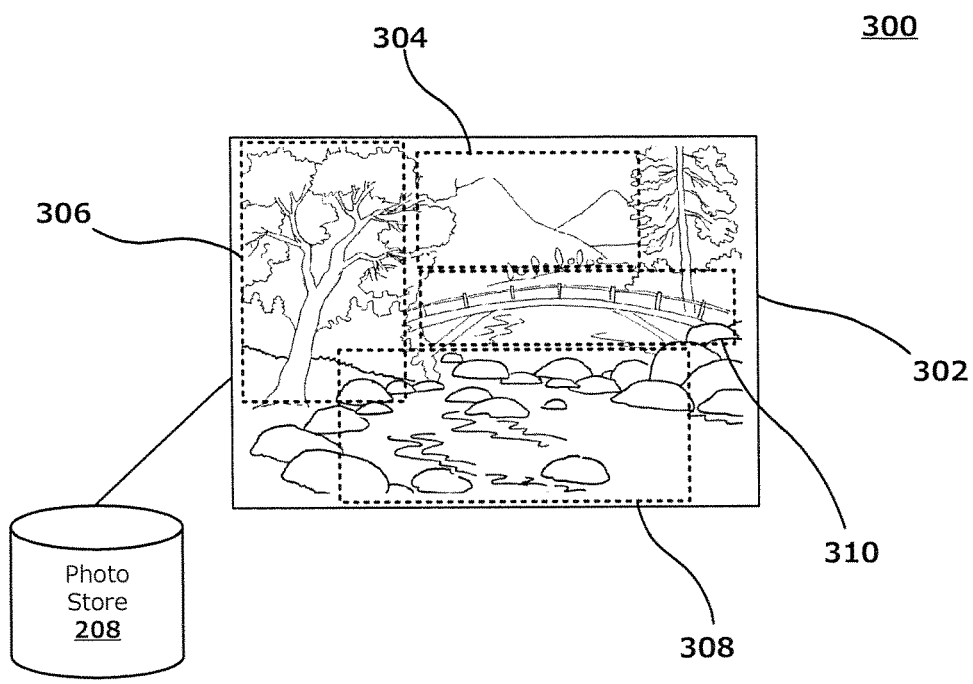
FIGS. 3A-3B illustrate example image analysis techniques, in accordance with various embodiments.
Figure 3B:
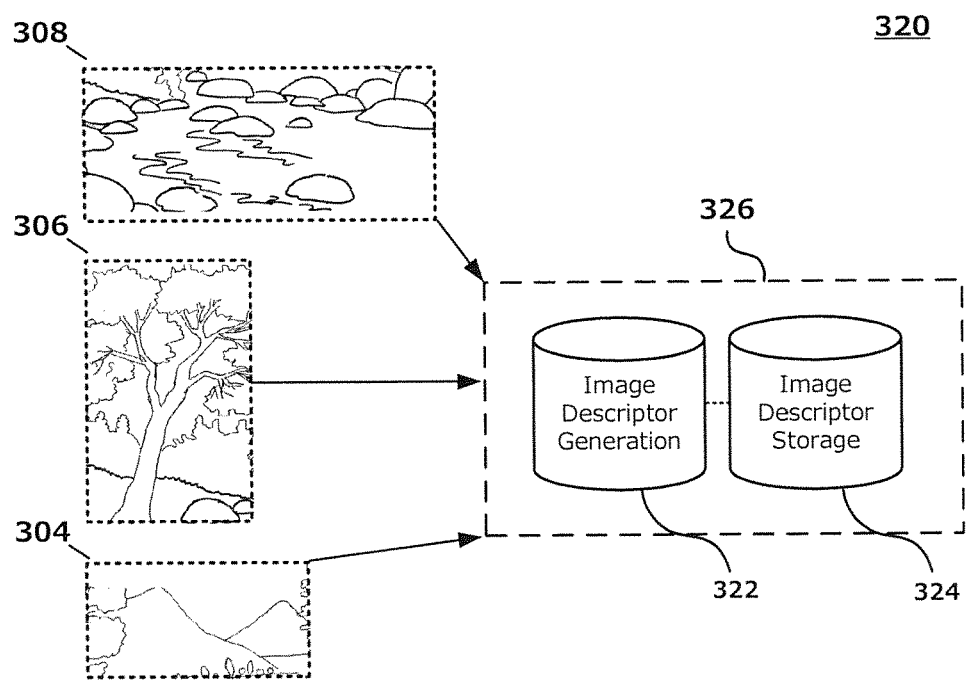

FIGS. 3A-3B illustrate example image analysis and segmentation techniques, in accordance with various embodiments. FIG. 3A illustrates an example 300 of an image 302, such as that taken with reference to FIGS. 1 and 2. The image 302 may be analyzed to identify and assign image descriptors (e.g., tags, labels, etc.) based on the image, for example from an image analysis component 326 such as the example illustrated in FIG. 3B. In one example, the image is segmented into regions of interest. For example, the digital image 302, which may be analyzed and/or stored locally to a computing device on remotely, such as in a photo store 208 as discussed previously, is processed using various object recognition approaches as discussed more fully herein. By recognizing various objects and items of interest in an image, regions of interest associated with the identified objects and/or items may be identified. In various embodiments, regions of interest are not generated, instead relying solely on object/scene/sentiment/etc. recognition. The regions of interest in various embodiments are utilized as a first processing step in service to or complementary to object recognition. In the example 300 of FIG. 3A, the image 302 is segmented into four regions of interest 304-310, such as by using techniques known in the art of image analysis.

FIG. 3B illustrates an example 320 approach of analyzing the regions of interest 304-308. For example, one region of interest 304 is analyzed using object recognition techniques and it is determined that the region of interest 304 contains a mountain. Another region of interest 306 is analyzed and determined to contain a tree. Another region of interest 308 is analyzed and determined to contain a river. According to various embodiments, the region of interest and/or object recognition processes may take place locally on a device or at one or more servers/image analysis components 326, such as one hosting processes and storage for image descriptor generation 322 and image descriptor storage 324.

In the example 320 of FIG. 3B, based on techniques such as region of interest identification and object recognition, an image descriptor generation component 322 may assign one or more image descriptors to the image. For example, based on the recognition of a tree 306, a mountain, 304, and a river 308, various descriptors may be generated 322 and stored 324 in associated with the image, such as "tree," "mountain," "river," "outdoors," "camping," "vacation," "nature," etc. Other data may be utilized as well to assign various descriptors, such as that which may be obtained through scene recognition (e.g., by determining an "outdoor" scene, such as by identifying blue sky, sunlight, color patterns representing nature, etc.), location data (e.g., GPS data included with the image indicates a forest), user-provided data such as a caption (e.g., "Outdoors in the mountains!"), and the like.

FIGS. 4A-4D illustrate example embodiments for image selection and analysis, in accordance with various embodiments. In the example 400 of FIG. 4A, a user 410 is playing a song 404 on a computing device 402. In addition to various user interface elements 406, the user 410 is presented with, and selects, an option 408 to generate a playlist using pictures. In the example 420 of FIG. 4B, the user 410 is presented with a display of various images 422. For example, the images may be stored locally to the computing device 402 (e.g., pictures taken by the user or downloaded by the user to the device 402, etc.), or may be stored remotely, such as on a server. The user 410 selects two of the images 424, 426.

Figure 4B:
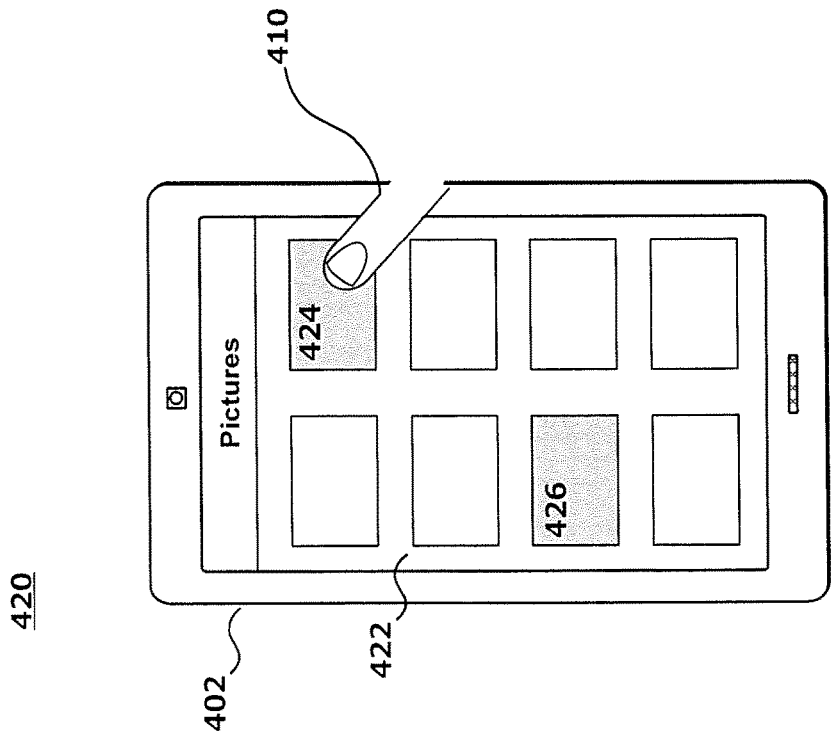
FIGS. 4A-4D illustrate example embodiments for image selection and analysis, in accordance with various embodiments.
Figure 4A:
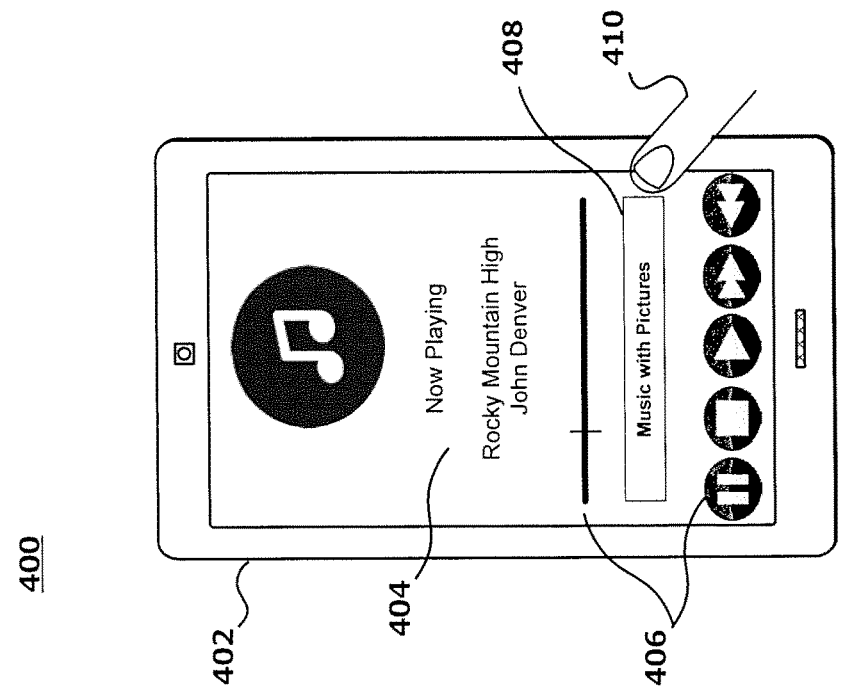
Figure 4C:
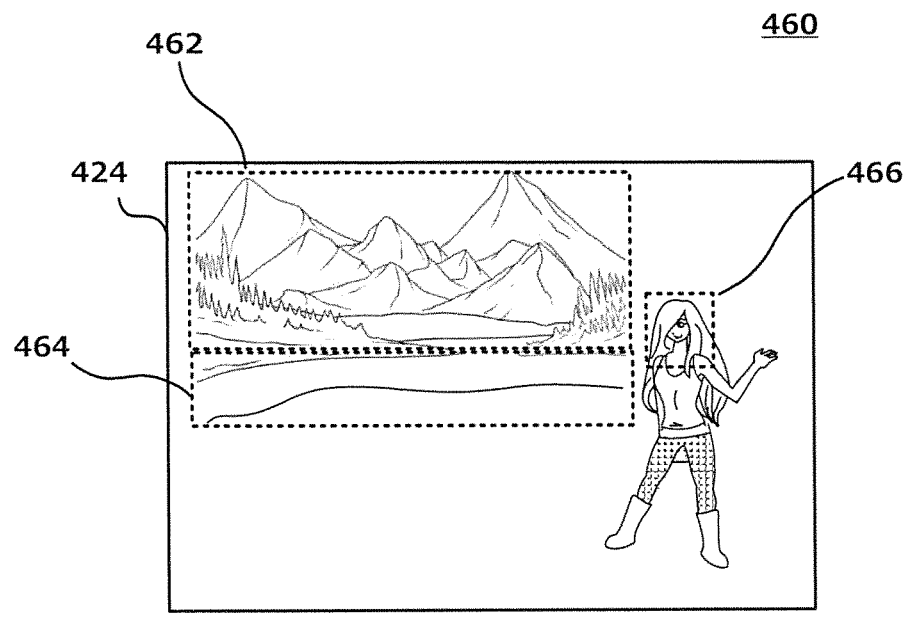
Figure 4D:
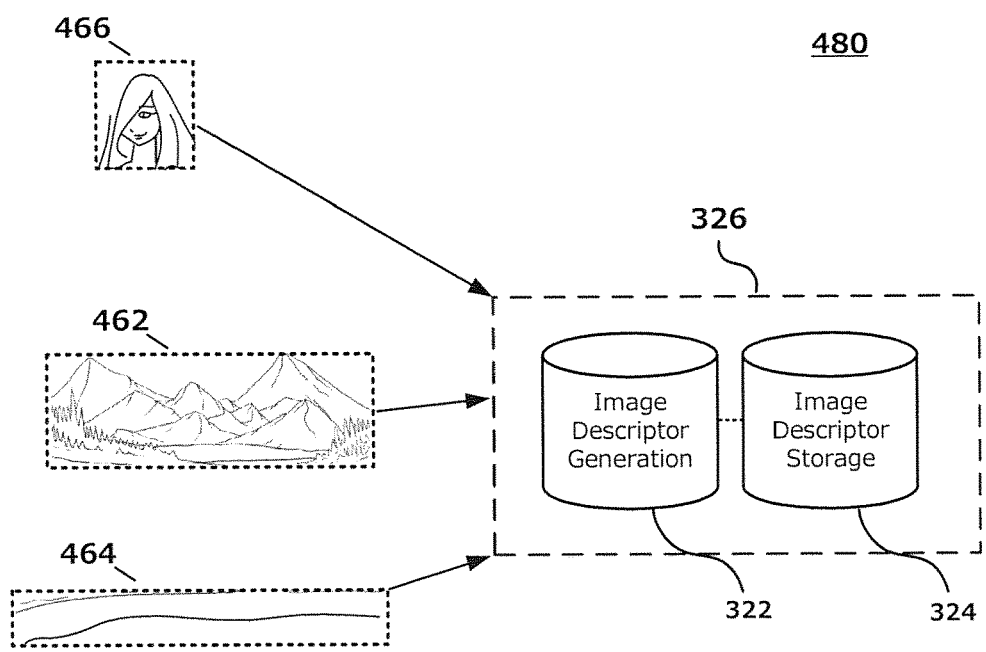

In the example 460 of FIG. 4C, one of the images selected by the user 424 is illustrated. In the image 424, several regions of interest 462-466 are identified, for example one the computing device or at a remote electronic environment, such as one of the examples discussed further herein. In the example 480 of FIG. 4D, the identified regions of interest 462-466 are processed by approaches described herein, such that objects in the regions of interest may be identified. For example, in one region of interest 466, a person's face is identified. According to various embodiments, facial recognition may be utilized to identify the person whose face is identified in the image data. In another region of interest 462, mountains are identified. In another region of interest 464, a river is identified. As discussed earlier, the objects of interest, as well as additional data, may be transmitted to a service 326 providing image descriptor generation 322 and image descriptor storage 324.

In various embodiments, other image analysis approaches known in the art may be utilized in order to identify and assign image descriptors to an image 424, and the discussion of regions of interest and objects of interest in the disclosure should be construed as limiting the approaches described herein to such techniques.

Figure 5:
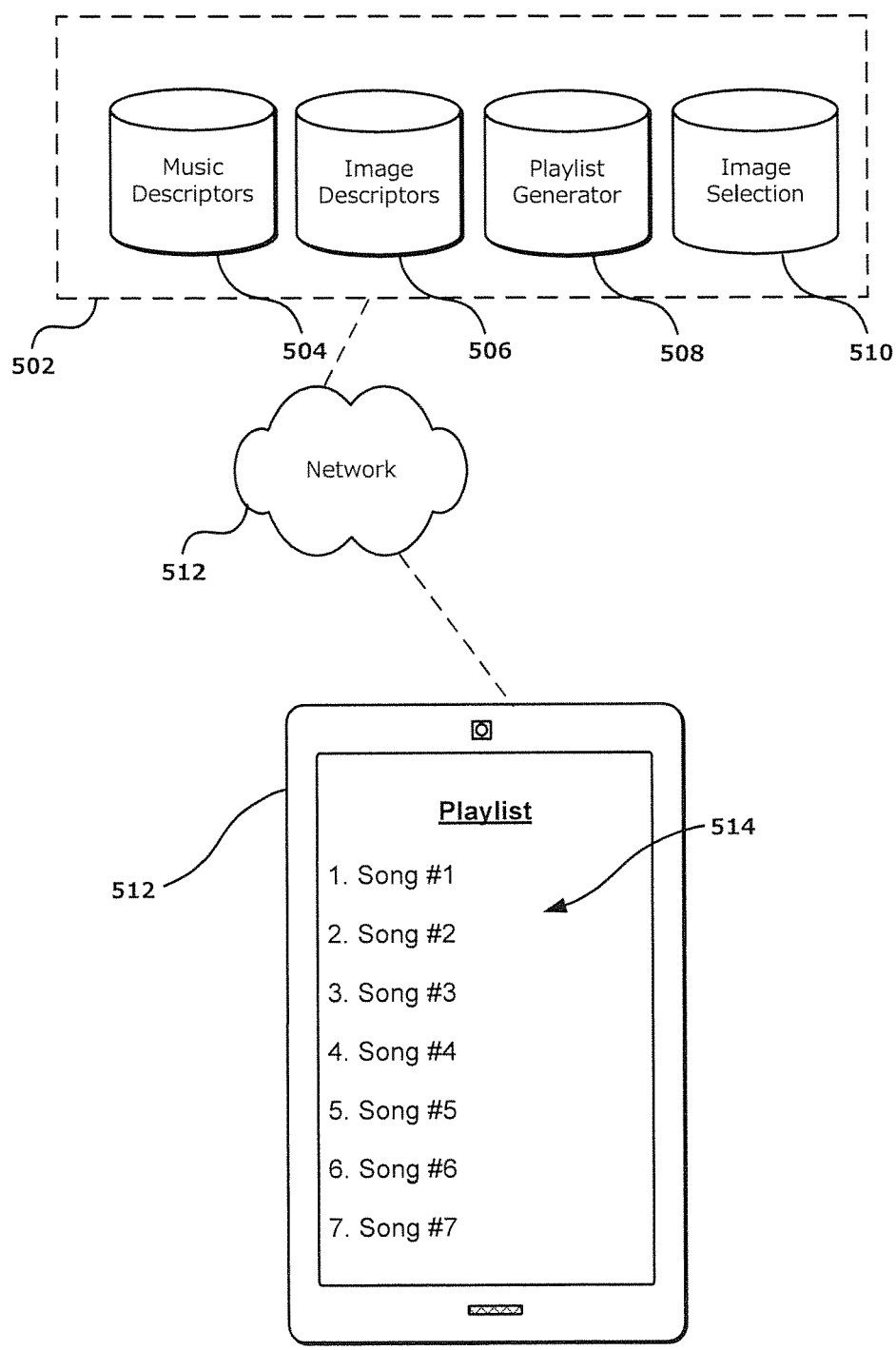
FIG. 5 illustrates an example playlist generation, in accordance with various embodiments.

FIG. 5 illustrates an example playlist generation 500, in accordance with various embodiments. In FIG. 5, a service 502 that in various embodiments comprises music descriptors 504, image descriptors 506, a playlist generator component 508, and an image selection component 510 is provided. Once a user has selected various images and the images are analyzed to assign image descriptors as illustrated earlier, the image descriptors are stored 506. In an embodiment, one of the identified image descriptors is included as part of a query against a set of music descriptors 504. The music descriptors 504 are associated with one or more songs, such as may be stored in a song database (not pictured) on a computing device or on a server. In an embodiment, the songs are available to the computing device, such as locally or over a network 512, such as with a music streaming service or online music storage. In various embodiments, songs that are not available to the computing device (e.g., are stored at a server but not associated with an account of the user of the computing device) are not included in the query.

A mapping between the queried image descriptor and the set of music descriptors is determined. For example, an image descriptor of "party" may be mapped (e.g., correlated, matched, etc.) to various music descriptors such as "happy," "upbeat," "bright," etc. In various embodiments, each mapping between an image descriptor and a music descriptor is associated with a similarity score, confidence level, etc. that represents a degree of matching between the image descriptor and the music descriptor, such as based on machine learning and neural network analysis techniques. Using the mapping data, the playlist generator 508 identifies songs associated with the mapped song descriptors, such as those matched to above a threshold level of certainty, and generates a playlist 514 (e.g., an ordered listing of songs, although the order is optional is various embodiments). The playlist 514 is transmitted over the network 512 to the computing device 512 for playback.

Figure 6A:
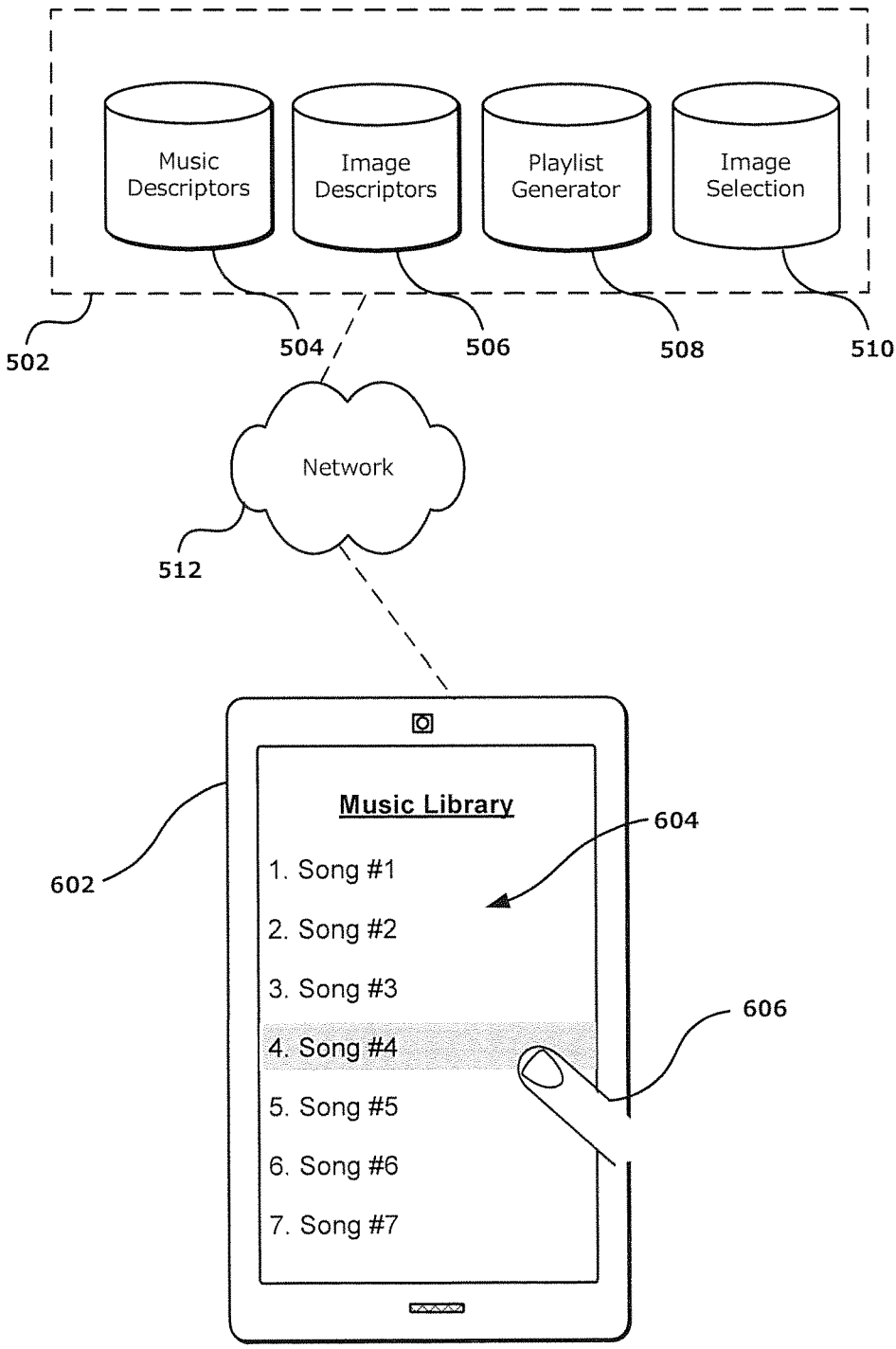
FIGS. 6A-6B illustrates example image selection techniques, in accordance with various embodiments.
Figure 6B:
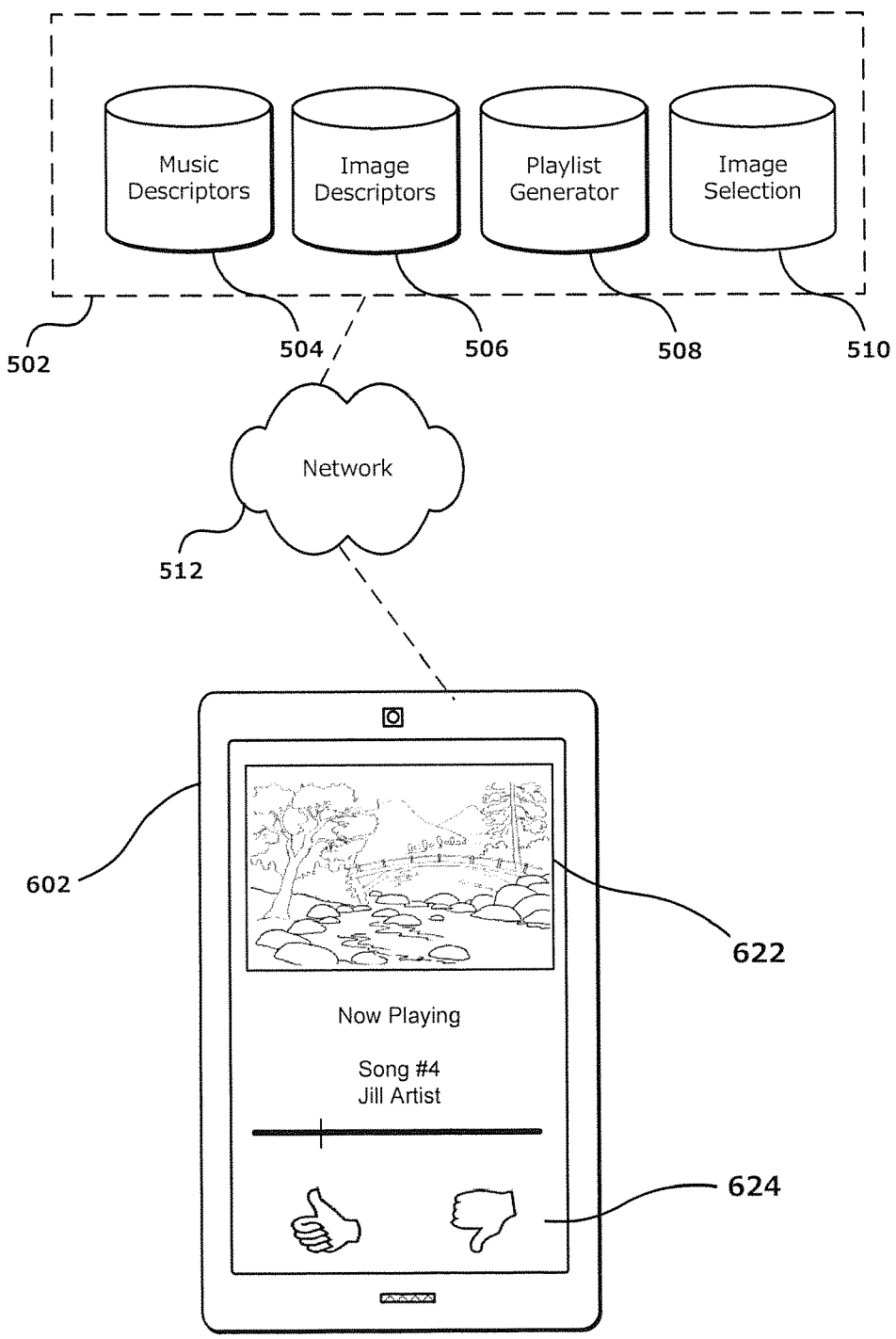

FIGS. 6A-6B illustrates example image selection techniques, in accordance with various embodiments. In the example 600 of FIG. 6A, a computing device 602 has a music library 604 of songs that may be played on the device 602. A user 606 selects one of the songs 604, and an identifier associated with the song is transmitted over a network to a remote service 502 as described with regard to FIG. 5. In the example 620 of FIG. 6B, the stored music descriptors receive the song identification and retrieve song descriptors associated with the song. The retrieved song descriptors are then mapped to image descriptors, as discussed herein, and images from an image store are selected based on the mapping between the song descriptors and the image descriptors, such that images with image descriptors matching the mapped image descriptors are selected. The selected images, or data capable of identifying the selected images, is transmitted over a network 512 to the computing device 602 for display 622 during playback of the song 626. In various embodiments, as described herein, interface elements 624 may be provided for a user to fine-tune the music and/or the images.

Figure 7:
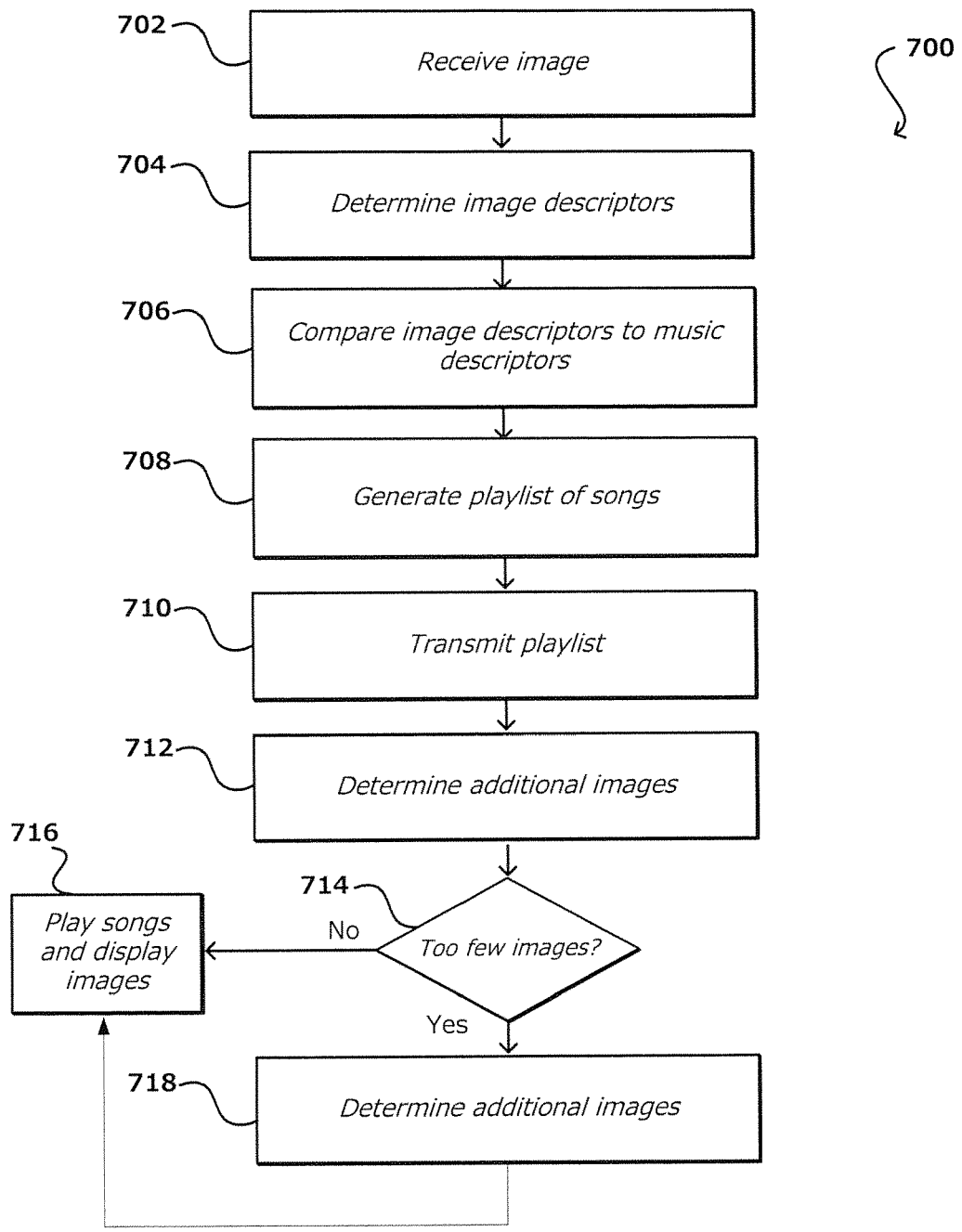
FIG. 7 illustrates an example process for selection of image and/or audio data, in accordance with various embodiments.

FIG. 7 illustrates an example 700 process for selection of image and/or audio data, in accordance with various embodiments. Although this and other figures may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In the example 700 of FIG. 7, an image is received 702, for example from a computing device of a user who selects one or more images as seed values for a music playlist. In some embodiments, additional data (e.g., image capture data, metadata, etc.) is included with the image or retrieved based on an identifier associated with the image. This additional data may comprise data related to conditions describing the capture of the image data. For example, location data (e.g., GPS) may identify a location where the image was captured; ambient audio capture coincident to the image capture may identify birds in a forest or a song that was playing nearby; data may identify a song playing on the capture device; user information related to the user capturing the images, such as a linked account with an online service, electronic marketplace, etc.; date and time information; and similar data may be transmitted and/or retrieved.

Image descriptors for the image are determined 704; in one example, regions of interest in the image may be identified, and the regions of interest are analyzed to determine various characteristics of the regions of interest and/or the images. For example, objects represented in the regions of interest may be determined, using image classification techniques described herein and known in the art, as well as scene data corresponding to the image. For example, an image determined to contain regions of interest containing objects identified to be a tree and a river may be combined with a color palette in a region of interest to determine that the image is of an outdoor scene. Faces may also be identified, for example in regions of interest. Once the regions of interest (e.g., the objects, scenes, sentiments, faces, etc.) are determined, then image descriptors for the image may be determined by comparing the regions of interest and/or the objects, scenes, sentiments, faces, etc. to a set of stored image descriptors and the regions of interest, objects, scenes, sentiments, faces, etc. from which the stored image descriptors were classified and/or manually curated.

Once the image descriptors are generated/determined, then a comparison 706 is made between the image descriptors associated with the image and a set of music descriptors, for example in a query against the set of music descriptors. The music descriptors may comprise tags, metadata, labels, etc. that are associated with songs. For example, a server may comprise a song store of multiple songs available to a user and the user's computing device. For example, a streaming music service to which the user has an account, or an electronic environment (e.g., a cloud environment) where songs are stored, such as songs belonging to a user. In various embodiments, the music descriptors are data describing characteristics of the song. For example, regarding tempo (fast), mood (happy), and the like. Additional data may be associated with the songs, such as location data corresponding to locations where the song has been played by various users, account information that indicates details about various purchases of the song (e.g., by whom, where, when, etc.), artist/album/length, etc. A mapping between the determined image descriptors and the song descriptors is made, and a playlist of songs is determined based on the mapping 708. For example, each song in the playlist in various embodiments is associated with at least one music descriptor that is mapped to at least one of the image descriptors.

Once the playlist is generated, it is transmitted 710 to a computing device of the user, for example the device from which the original image(s) were selected. As part of the playlist generation, in various embodiments additional images may be determined 712. For example, at least one of the image descriptors originally determined for the query image may be queried against a database of stored images and their associated image descriptors. According to various embodiments, computer vision and/or deep learning/neural networks are used to identify visually similar images to the original image(s). In various embodiments, as described herein, the stored images may be associated with the user of the computing device (e.g., an account of the user with a photo storage service) or may comprise third party images.

Another mapping may be generated as a result of a comparison/correlation between the image descriptors determined for the original image and the image descriptors associated with the stored images, and stored images identified as a result of the mapping may be transmitted (or an identification of the images may be transmitted) to the computing device such that the computing device may retrieve the images and display them while the playlist is being played.

In some embodiments, the amount of images identified to the device may not be enough to display during the playlist without the images being displayed too many time. For example, if the playlist is one hour long, and there are only four images identified to the device as being scheduled to be displayed during the playlist, then each image may be shown once for 15 minutes each, or 15 times for one minute each, for example. If the interval of time between display of the images is short, then the images may be displayed an unacceptable number of times. By comparing the duration of the playlist, the number of images to be displayed, and the interval of time between display of subsequent images, it may be determined 714 that the images will be displayed over (or under, in various embodiments) a threshold number of times. If not, then the images are displayed and the playlist is played 718. Otherwise, additional images are determined 718, for example in a third-party store of images (e.g., images not associated with an account of the user).

Figure 8:
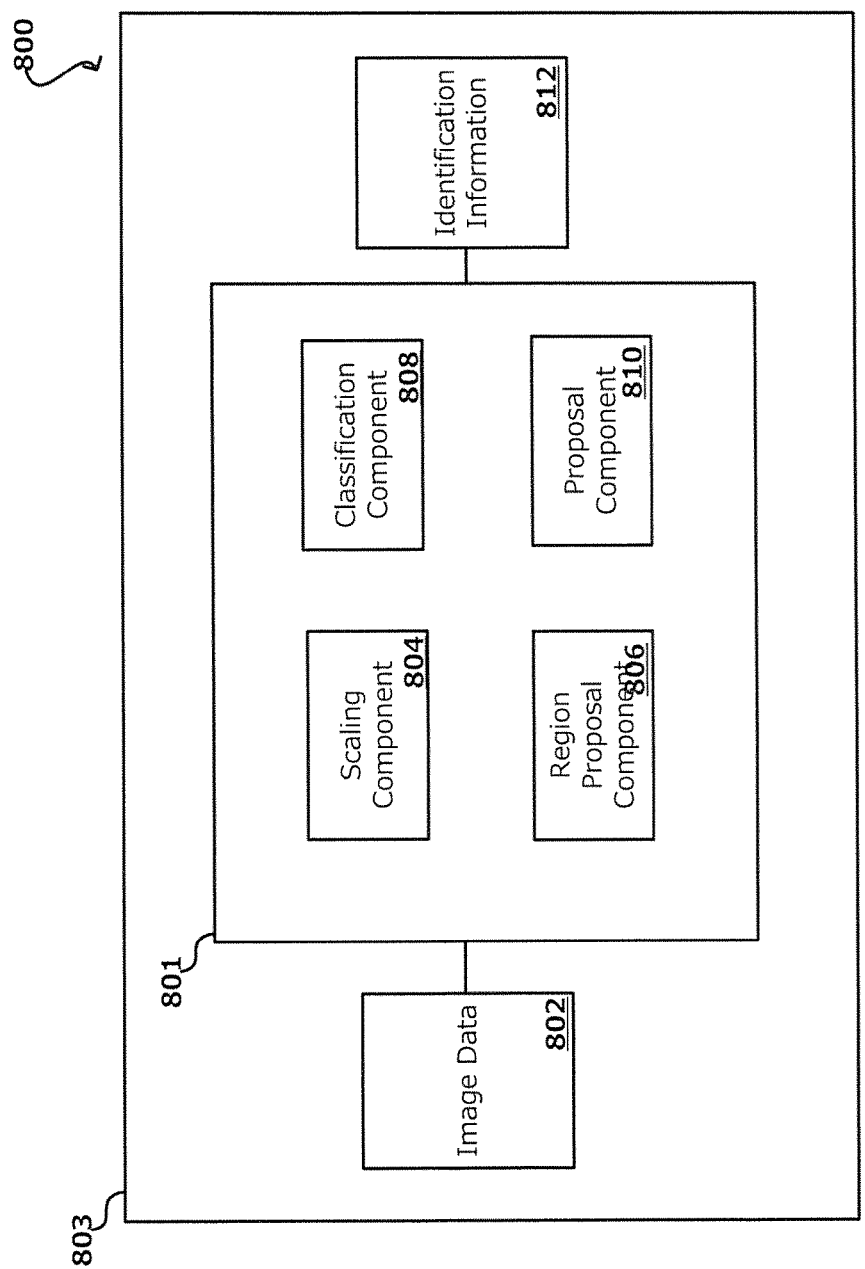
FIG. 8 illustrates an example system for classification of image data in accordance with an embodiment.

FIG. 8 illustrates an example system 800 for classification of image data (e.g., identifying regions of interest and objects of interest within the regions of interest, scene recognition, applying image descriptors appropriate for the region of interest, etc.) in accordance with an embodiment. It should be understood that classification of image data includes, for example, recognizing items represented in image data, determining a region or portion of the image that includes the representation of the item(s) (e.g., a "region of interest"), and generating a label that includes a descriptor and/or category for the items and/or regions recognized. In this example, a user is using a camera of a computing device 803 to capture image data 802 of a scene, although the example discussed herein are applicable to capturing image data of a live camera view, of an image itself, and/or being utilized on stored image data, for example on a user's computing device or a remote computing environment such as a "cloud" electronic environment. It should be noted that in various embodiments the image data can be downloaded to the computing device. In any situation, the image data can include a number of items contained within a number of regions of interest in the image data. In this example, the image data includes representations of trees, water, clouds, mountains, and people (e.g., faces), among other items. The image data can be analyzed to attempt to recognize regions of interest that may contain these types of items, as well as other types of data that can be identified and analyzed in image data, such as facial expressions (e.g., happy, sad), ambient conditions (e.g., weather, temperature, etc.) and these items contained within the region(s) of interest. In some embodiments, the step of identifying a region of interest may be eliminated and all objects/items of interest in the image data may be identified and classified. Once the process has identified all applicable regions and/or items/objects of interest, image descriptors and/or categories may be applied to the regions and/or items/objects of interest.

In accordance with various embodiments, the image data can be analyzed using software or a set of software components as may include an image analysis module 801 executing on the computing device (or in communication with the computing device, such as in the aforementioned cloud environment). The image analysis module can include one or more software components. As shown in FIG. 8, the image analysis component includes a scaling component 804, a region proposal component 806, a classification component 808, and a proposal component 810.

The scaling module 804, for example, can be configured to analyze the image data and generate a plurality of scaled images (i.e., a scale pyramid). The scaled images can be scaled down or scaled up from the original image data.

The region proposal module 806, for example, can be configured in various embodiments to analyze the plurality of scaled images and generate one or more patches, or regions of interest that include at least a portion of a representation of an item. In various embodiments, the patches include a plurality of overlapping regions. Various detection proposals can be implemented by the region proposal module as would be understood to those skilled in the art. For example, one such detection proposal uses a "sliding window" type approach, where an image is analyzed over a plurality of regions. The regions can range in size, shape, and placement, for example, the regions can be adjacent, overlapping, or a combination of thereof.

Other approaches attempt to determine regions based on image features other image information, and unlike the sliding window approach, these approaches analyze the image features to determine whether the region should be considered for classification. Example approaches include, for example, gPbUCM, Objectness, Endres2010, SelectiveSearch, Bing, among others. The patches can be associated with a position with respect to the image data and within the scale pyramid, a shape, and a size. Example shapes include squares, rectangles, among others. Example sizes can be measure in units of the size of the patch elements (e.g., pixels) and can be anyone of a number of sizes.

The classification module 808, for example, can be configured to analyze the patches proposed by the region proposal module 806 and can generate a classification vector or other categorization value that indicates the probability that a respective patch includes an instance of a certain category and/or descriptor. In some embodiments, the potential instances that are being matched to are referred to as categories of items, and a label that is applied to the recognized item and potentially stored along with the image data or a reference to the image data is referred to as a descriptor. In accordance with various embodiments, a category and/or descriptor can refer to a class or division of things regarded having particular shared characteristics. An example category and/or descriptor can be a tree, water, a cloud, among others. The classification vector can include an entry (i.e., a probability) for each of the categories the classification module is trained to recognize. For example, the classification vector can indicate the probability that there is a tree or a cloud in a respective patch. The classification vector can be used by the proposal component 810 to determine patches that are most likely to include an item.

For example, based at least in part on the position, the shape, and the classification vector of a plurality patches, the proposal module 810 can generate a second set of position, shape, and classification vector information. The second set of information is usually a smaller dataset of information because the second set of information is derived from patches that are most likely to include an item. For example, patches that belong to the background image (e.g., areas of the image that do not include an item) can be discarded. Patches that are considered similar, for example, patches that are positioned near one another and have a classification vector (or other categorization value) above a categorization threshold can be merged, grouped, or otherwise associated to one another, wherein the merged patches can correspond to a region that includes the item. The region can be illustrate using a graphical outline, such as a bounding box, and can be associated a descriptor. The descriptor can indicate, for example, the category (e.g., tree, water, cloud, etc.) the item is classified as.

In accordance with various embodiments, the classification module 808 can implement a machine learning algorithm to classify the patch or other region(s) of interest of the image. Examples of machine learning include principal component analysis (PCA), neural networks, support vector machines (SVM), inductive learning, adaptive boosting (Adaboost), deep learning, among others.

In PCA, eigenvectors are computed on a training set of images known to include objects corresponding to a particular classification to determine the covariance matrix of the training set. Training images known to include the classified are projected onto "a classified object subspace" and clustered. The distance between a region of each training image known to include the classified object and the classified object subspace is computed for the training image. The distance from the classified object subspace is used as a measure of whether a query image includes a classified object, and the distances from the classified object subspace form a "classified object map." An object can be detected to be presented in a query image from the local minima of the "classified object map."

Neural networks are inspired by biological neural networks and consist of an interconnected group of functions or classifiers that process information using a connectionist approach. Neural networks change their structure during training, such as by merging overlapping detections within one network and training an arbitration network to combine the results from different networks. Examples of neural network-based approaches include the multilayer neural network, the autoassociative neural network, the probabilistic decision-based neural network (PDBNN), and the sparse network of winnows (SNoW).

Support vector machines (SVMs) operate under the principle of structural risk minimization, which aims to minimize an upper bound on the expected generalization error. An SVM seeks to find the optimal separating hyperplane constructed by support vectors, and is defined as a quadratic programming problem. The Naïve Bayes classifier estimates the local appearance and position of object at multiple resolutions. At each scale, a training image is decomposed into subregions and the subregions are further decomposed according to space, frequency, and orientation. The statistics of each projected subregion are estimated from the projected samples to learn the joint distribution of object and position. An object is determined to be within an image if the likelihood ratio is greater than the ratio of prior probabilities.

AdaBoost is a machine learning boosting algorithm which finds a highly accurate hypothesis (i.e., low error rate) from a combination of many "weak"; hypotheses (i.e., substantial error rate). Given a data set comprising examples within a class and not within the class and weights based on the difficulty of classifying an example and a weak set of classifiers, AdaBoost generates and calls a new weak classifier in each of a series of rounds. For each call, the distribution of weights is updated that indicates the importance of examples in the data set for the classification. On each round, the weights of each incorrectly classified example are increased, and the weights of each correctly classified example is decreased so the new classifier focuses on the difficult examples (i.e., those examples have not been correctly classified). An example of an AdaBoost-based approach is the Viola-Jones detector. Viola-Jones scans a sub-window of an input image using features consisting of Haar-like features, black and white boxlets that are weighted during training, and resized over several passes of the detector. A sub-window is determined to be a candidate of a classified object if the difference of the sum of pixels within two regions meets a threshold θ for a Haar-like feature determined during the training stage. Viola-Jones further utilizes the concept of attentional cascading which observes that within an image, most sub-windows are not instances of the classified object. Thus, smaller and more efficient classifiers can be used to reject sub-windows unlikely to be the classified object at earlier stages of the detector while keeping almost all of the positive instances. More complex classifiers are used at later stages to examine candidates that have not been rejected as candidates of the classified object.

In accordance with various embodiments, deep learning involves modeling high-level abstractions in data using multiple non-linear transformations. Deep learning techniques are based on the premise that images can be represented in many ways but, from exemplars, certain representations can make it easier to learn tasks of interest, such as object classification of an object represented in an image, such as in a region of interest of an image. Deep learning techniques include deep neural networks, convolutional deep neural networks, and deep belief networks. As will be apparent to persons of reasonable skill in the art, any number or combination of classification approaches can be applied herein. In this example, the image analysis module implements a deep neural network, such as a convolutional neural network, and can be trained to classify different categories. The categories can correspond to products offered through an electronic marketplace.

As would be understood to one skilled in the art, neural networks consist of multiple layers of neuron collections which look at portions or regions of the input image, called receptive fields. A neuron (or unit) can be a mathematical function. Neurons are the constitutive units in an artificial neural network. The neuron receives one or more inputs such as portions of an image and sums them to produce an output. Usually the sums of each node are weighted, and the sum is passed through a non-linear function known as an activation function or transfer function. The transfer functions usually have a sigmoid shape, but they may also take the form of other non-linear functions, piecewise linear functions, or step functions. They are also often monotonically increasing, continuous, differentiable and bounded.

Convolutional networks may include local or global pooling layers, which combine the outputs of neuron collections. They also consist of various combinations of convolutional layers and fully-connected layers, with pointwise nonlinearity applied at the end of or after each layer. The results of the neuron collections are then tiled so that they overlap to obtain a better representation of the original image and this process is repeated for each layer.

Convolutional layers, for example, have well defined receptive fields. In accordance with various embodiments, convolutional layers operate on a specific region of the image. The size of the receptive field is a property of the units that make up the layer to which the region is associated with and not a property of the convolutional network. As such, the size of the receptive field is independent of the size of the input image. In this way, if the input image were to grow in size, then the layer would also grow by adding more units of the same type at its edges. Further, as is understood in the art, a notion of location in the original image is retained for convolutional layers throughout the convolutional network. Each particular unit has a receptive field that is defined in shape and size and resides at a specific location in the original image, and if the size of the input is increased, each output can be associated to a specific proposal region.

In each convolutional layer, the convolutional network uses a shared weight, and each layer will compute the output of neurons that are connected to local regions (i.e., receptive fields) in the input, where each neuron computes a dot product between their weights and the region (i.e., receptive field) they are connected to in the input. In this way, each neuron looks at a specific region (i.e., receptive field) of the image and outputs one number: the dot product between its weights and the pixel values of in its region (i.e., receptive field).

Fully-connected layers, for example, operate on the entire input and the receptive field size is defined as the entire image. Regions of the image feed into all units of the layer. If the input image were to grow, a fully-connected layer would not grow in size, it would add more connections, those from regions at the edges of the image to its units, but it would not add more units. Thus, regardless the size of the input image, the receptive field of each unit is always the entire input.

In accordance with various embodiments, the functional role of each unit in a fully-connected layer can be implemented by a unit in a convolutional layer. For example, a convolutional layer can be designed such that the receptive field of its units is the entire input. In this situation, if the input grows, the convolutional layer is configured to add more units instead of adding more connections. For at least purposes of localization, such a feature is desirable. This is because while performing the same function as fully-connected layers, the modified convolutional layers preserve well defined position in the input image when the input size grows.

Accordingly, in accordance with various embodiments the convolutional architecture can be used to re-use computations common to overlapping regions, which can result in fewer computations and can advantageously reduce processing time and/or computing resources for fast localization and other like approaches. For example, a region can be identified in each layer. A region can be identified, for example, by a sliding-window, where the sliding-window includes the region and can have a predetermined size, for example, 11×11 pixels or some other size. The convolutional network can determine a first output using pixels values in the first region. The sliding-window can be moved to a second region, for example, two pixels to the right of the first region. In this situation, the second region overlaps a portion of the first region. The overlapping portion, or third region, includes the right 9×11 pixels of the first region. The second region includes a new region, or a fourth region, of 2×11 pixels that has not been analyzed. The fourth region can be analyzed. Analyzing the fourth region can include, for example, computing the dot product between predetermined weights and the pixel values of the fourth region.

In accordance with various embodiments, to adapt an existing, pre-trained network for localization use, a fully-connected layer can be substituted with a convolutional layer while preserving functional equivalence. As one skilled in the art would appreciate, this can be accomplished due in part to the fact that fully-connected layers implement multi-layered perceptrons, and hence fully-connected units perform dot-products between the input and a set of weights.

This is the same operation that convolutional layers perform. As such, the weights from the trained fully-connected layer can be copied to a convolutional layer for deployment.

In various embodiments, for a fully-connected layer that has a convolutional layer as input, the size of the output for the layer immediately below it is determined such that the fully-connected layer can be properly replaced by a convolutional layer by setting the kernel size for the convolutional layer to the size of entire input. For fully-connected layers that have as input fully-connected layers (or convolutional layers that are actually replacing fully connected ones), the kernel size can be 1 because there is no notion of locality. In at least this situation, 1×1 pixel filters can be used.

In accordance with various embodiments, various approaches can be used when implementing aspects of the proposal module 810. For example, a max confidence approach ranks patches by a patches associated classification vector, where a high classification vector corresponds to a high likelihood that an object of a particular category is present in the patch. Grouping patches can include, for example, grouping patches associated with a classification vector above a predetermined threshold can or grouping a predetermined number of patches, the predetermined number of patches being selected from a highest confidence vector down until the predetermined number of patches is selected.

In another example, an entropy ranking approach can interpret the classification vectors as a probability distribution over the categories associated with the image data. The entropy of the distribution can measure how peaked over a few categories the distribution is. The peak can represent a confidence level that there is an object in a particular region of patches of the image data. The patches can then be ranked based on the entropy of the classification vector.

In another example, a bottom-up merge approach determines a distance between patches. The distance can be defined as $(1-IOU(x,y,))+EMD(x,y)$, where IOU is the intersection over the union of the area of two patches and EMD is the Earth Mover distance between two classification vectors of the two patches. In this example, two patches are close if they have an overlap above a predetermined threshold in space and their respective classification vectors are within a difference threshold. Accordingly, the pairwise distance between patches is determined, and the two closest patches are merged to generate a new patch. The two original patches are removed from the original set and the new merged patch is added. The procedure is repeated until only a certain number of patches are left in the set or when the distance meets a predetermined distance threshold even for two closes patches. In accordance with various embodiments, merging a first patch with a second patch can include determining a first location of the corners of the first patch and a second location of the corners of the second patch, determining an average location of the corners of the first patch and the second patch, determining an average classification vector of the first patch and the second patch; and generate a new patch. In various approaches, a preprocessing step of entropy ranking can be performed to remove patches associated with flat and indecisive histograms. Thereafter, the remaining patches can be used in the bottom-up merge approach. In another example, a clustering approach determines the distance between patches and applies affinity propagation clustering to generate patches that are then centroids of the pair.

As described, in response to recognizing an item or object, for example being located in a region of interest in image data, an image descriptor may be assigned or associated with the item, object, and/or the region of interest that attempts to categorize and/or otherwise identify the item, object, and/or region of interest. Based on one or more of the classified items, objects, and/or regions of interest, and potentially other data such as metadata associated with the image (e.g., location data such as GPS data, date data, account information of a user associated with the device capturing the image, music or audio being captured along with the image, etc.), the techniques described herein may allow a determination of qualities of the image, such as potential "scenes," "sentiment," and/or "tone." For example, an image that has several items and/or regions of interest having been classified as "cubicles," "whiteboards," "florescent lights," etc., may be determined to be in an "office environment," based on classification of image data from a known environment that contains these types of items, for example, and an appropriate descriptor may be associated with the image. Such an image may further be determined to be a particular scene such as a "party," for example based on classified items and/or regions of interest in the image, such as facial expressions on identified faces in the image, the presence of a "cake" item, a determination that various people in the image data are dancing (e.g., based on a classifier that identified various body positioning as being associated with dancing, etc.), audio of a song (e.g., "Happy Birthday") that was playing at the time the image data was captured, and location data associated with the image data that indicates the image data was captured at a restaurant, etc. Image data may further classified with a particular "sentiment," such as "happy" or "sad," and an appropriate descriptor associated with the image. This sentiment may be determined based on classified images that analyze facial expressions, for example.

In accordance with various embodiments, determining image descriptors (i.e., feature descriptors) to be applied to image data based on subject matter, regions of interest, and/or depicted objects in the image data can be determined using a classifier trained to identify objects (e.g., people, faces, cars, boats, airplanes, buildings, fruits, vases, birds, animals, furniture, clothing etc.) represented in image data (e.g., a digital photo, digital video, etc.) to generate an image descriptor that can be used to compare against a data store of image descriptors to identify potentially related items and/or regions of interest in the image data. Various types of classifiers may also be trained to identify subjects, which may include one or more objects that define a particular type of scene, either similar to or in a different manner than the scene recognition described earlier herein. For example, subjects may include landscapes, cityscapes, portraits, night skies, or other subject matter. The classifier can be trained using a convolutional neural network (CNN), or other examples of machine learning as described above. Image descriptors may be identified using both computer vision techniques and using CNN classifiers.

In various embodiments, and to elaborate further on the discussion of CNN above, convolutional neural networks are a family of statistical learning models used in machine learning applications to estimate or approximate functions that depend on a large number of inputs. The various inputs are interconnected with the connections having numeric weights that can be tuned over time, enabling the networks to be capable of "learning" based on additional information. The adaptive numeric weights can be thought of as connection strengths between various inputs of the network, although the networks can include both adaptive and non-adaptive components. CNNs exploit spatially-local correlation by enforcing a local connectivity pattern between nodes of adjacent layers of the network. Different layers of the network can be composed for different purposes, such as convolution and sub-sampling. There is an input layer which along with a set of adjacent layers forms the convolution portion of the network. The bottom layer of the convolution layer along with a lower layer and an output layer make up the fully connected portion of the network. From the input layer, a number of output values can be determined from the output layer, which can include several items determined to be related to an input item, among other such options. CNN is trained on a similar data set (which includes people, faces, cars, boats, airplanes, buildings, landscapes, fruits, vases, birds, animals, furniture, clothing etc.), so it learns the best feature representation of a desired object represented for this type of image. The trained CNN is used as a feature extractor: input image is passed through the network and intermediate outputs of layers can be used as feature descriptors of the input image. Similarity scores can be calculated based on the distance between the one or more feature descriptors and the one or more candidate content feature descriptors and used for building a relation graph.

A content provider can thus analyze a set of images and determine items that may be able to be associated in some way. New images can be received and analyzed over time, with images having a decay factor or other mechanism applied to reduce weighting over time, such that newer trends and fashions are represented by the relations in the classifier. A classifier can then be generated using these relationships, whereby for any item of interest the classifier can be consulted to determine items that are related to that item visually.

In order to determine the items that are relevant to the item of interest, it can be desirable in at least some embodiments, to generate a robust color representation of the content item. For example, as described, a robust color representation is desirable in at least some embodiments, to identify relevant colors and the distribution of colors represented in images. A CNN can be used to learn a color descriptor corresponding to, e.g., a dominant color in the content item, a color distribution in the content item, etc., which may then be used to identify relevant content as described further herein.

In some embodiments, a content item may include multiple subjects. For example, as shown in FIG. 3A, content item 302 trees, water, mountains, and a bridge. In some embodiments, such a content item might be segmented into regions of interest, for example to isolate the different subjects. The portion of the content item corresponding to the tree 306 may then be analyzed as described above. In other embodiments, an automatic segmentation process can be used to analyze the various images and attempt to segment the image into portions corresponding to a single person or entity, individual objects or items in the image, or other such segments. In some embodiments, if a content item includes multiple objects, other content items that include the same or similar combination of objects may be identified. In some embodiments, a portion of the image may be selected, by a user or other entity, for further analysis and recommendation. In some embodiments, portions of the image may be sampled to automatically identify different portions of an image that include related regions (e.g., particular objects, patterns, or other features).

Various approaches may be used to determine a region of interest corresponding to one subject versus a region of interest corresponding to a different subject. For example, an attempt can be made to locate and/or grow connected regions of background color/pattern/imagery from the corners or sides of the image towards the center of the image, to the extent possible. A connected component analysis, for example, can be utilized to attempt to connect the entire background region of the image, with the remaining region(s) being considered potential objects(s) of interest. In example content item 302 of FIG. 3A, the content item can be sampled starting in the corners and move inward. The sampling may continue as the same pattern is identified.

Embodiments of the present invention can use a classification score (in some embodiments, a "similarity score") generated by the classification layer of the CNN to generate a local feature weight and an object recognition weight. The classification score generated by the CNN indicates how close the object in the query image (e.g., an object in a region of interest such as a tree, etc.) is to an object the CNN has been trained to identify. As such, high scores correspond to a high likelihood that the object in the query image is one or more specific objects, whereas low scores indicate that the object in the query image is likely not an object or is an object that the CNN has not been trained to identify.

Figure 9:
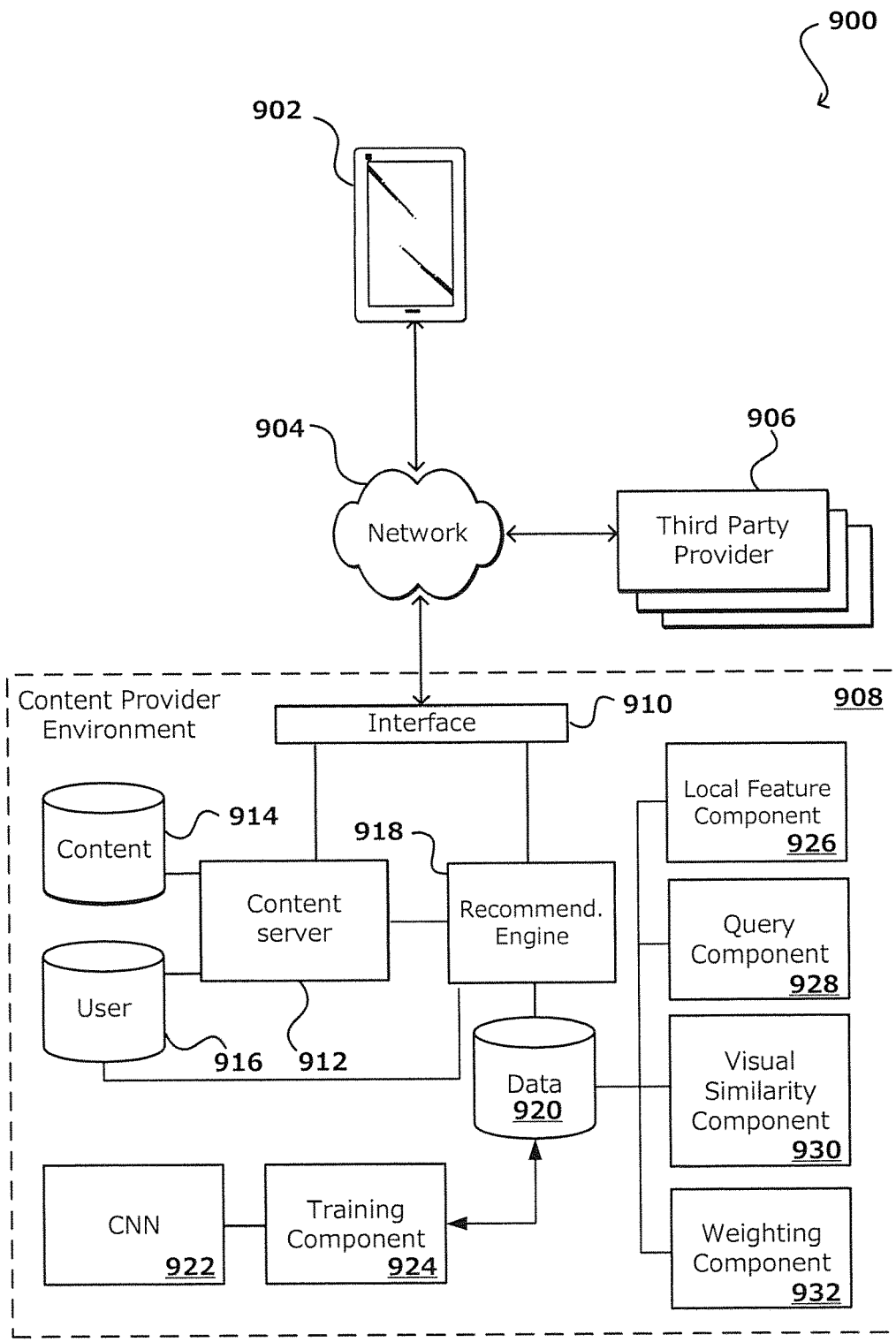
FIG. 9 illustrates an example environment for determining and associating image descriptors that can be utilized in accordance with various embodiments

FIG. 9 illustrates an example environment 900 for determining and associating image descriptors that can be utilized in accordance with various embodiments. In order to determine visually similar content items, in at least some embodiments, some analysis of content items in an electronic catalog or other data repository is performed to determine information about the visual characteristics of the items. In some embodiments, one or more image/feature descriptors can be generated to describe features of an image.

In the example shown in FIG. 9, a convolutional neural network (CNN) 922 can be trained using images of objects that include metadata. For example, the CNN 922 may be trained to perform object recognition using images of people, faces, cars, boats, airplanes, buildings, fruits, vases, birds, animals, furniture, clothing etc. CNN 922 can also be trained to identify the subject matter depicted in a given image, such as landscapes, portraits, night skies, cityscapes, etc. In certain embodiments, training a CNN may involve significant use of computation resources and time, such that this may correspond to a preparatory step to servicing search requests and/or performed relatively infrequently with respect to search request servicing and/or according to a schedule. An example process for training a CNN for generating descriptors describing visual features (e.g., items, objects, scenes, etc.) of an image in a collection of images begins with building a set of training images. In accordance with various embodiments, each image in the set of training images can be associated with an object label (i.e. image descriptor) describing an object depicted in the image or a subject represented in the image. According to some embodiments, training images and respective training object labels can be located in a data store 920 that includes images of a number of different objects, wherein each image can include metadata. The metadata can include, for example, the title and description associated with the objects. The metadata can be used to generate object labels that can be used to label one or more objects or subjects represented in the image. In some embodiments, the training images may include real world images (e.g., photographs of actual objects) and/or may include artwork images (e.g., artistic depictions of objects).

A training component 924 can utilize the training data set (i.e., the images and associated labels) to train CNN 922. In accordance with various embodiments, a CNN can be used to determine one or more objects and/or a subject represented in an image. As discussed herein, the subject may include landscapes, cityscapes, night skies, or other subject matter of the image. In some embodiments, the subject may include depictions of one or more objects, such as people, faces, cars, boats, airplanes, buildings, fruits, vases, birds, animals, furniture, clothing etc. As further described, CNNs include several learning layers in their architecture. A query image from the training data set is analyzed using the CNN to extract a feature vector from the network before the classification layer. This feature vector describes the subject and/or objects shown in the image. This process can be implemented for each of the images in the data set, and the resulting image descriptors can be stored in a data store.

Additionally, the set of training images, or other collection of images maintained by content provider environment 908, may also be used to generate a set of image descriptors using computer vision techniques. Local Feature component 926, or other such component, can cluster the image descriptors and associate the cluster with a visual word. Local Feature component 926 can create a local-feature histogram for each of the images, with each histogram including a number of bins that correspond to the number of clusters, with each cluster associated with a visual word. Each bin of a particular local-feature histogram is populated with data that indicates the number of the image descriptors of the image that were mapped to the cluster that corresponds to the bin. Accordingly, because each cluster is represented by a visual word, the data included in a bin of a local-feature histogram of an image indicates the number of image descriptors associated with each visual word.

A query image may be received from client device 902 over network 904 and processed by query component 928. In some embodiments, the query image can be received when a selection of an image from a third party provider 906 or content provider environment 908 is selected, e.g., through the selection of a content item. When a query image is received, for example, a set of query image descriptors may be obtained or determined for the query image. For example, if the query image is not part of an electronic catalog and does not already have associated image descriptors, the system may generate image descriptors for the query content in a same and/or similar manner that the image descriptors are generated for the collection of images, as described. Also, for example, if the query image is part of the collection then the image descriptors for the query image may be obtained from the appropriate data store. The query image can also be analyzed using the CNN 922 to extract a feature vector from the network before the classification layer. This feature vector describes the subject and/or objects shown in the image. Using the feature vectors and image descriptors, visually similar images in content provider environment 908 can be identified.

A visual similarity component 930 or other such component can be used to search the collection of images to identify a set of images that are visually similar to the query image. Since image descriptors have been calculated or obtained for the query image, comparing images can be accomplished by comparing the image descriptors of query images to the image descriptors of the images of the collection. According to some embodiments, dot product comparisons are performed between the image descriptors of the query image and the corresponding image descriptors of the images of the collection. The dot product comparisons are then normalized into similarity scores. In some embodiments, a color feature descriptor may also be determined for each image and a similarity score between the color feature descriptors of the images can be calculated. After similarity scores are calculated between the different types of feature descriptors of the images, the similarity scores can be combined. For example, the similarly scores may be combined by a linear combination or by a tree-based comparison that learns the combinations. For example, using a linear combination may provide the advantage of enabling a user to assign different weights to the different types of feature descriptors, thereby causing the search module to consider the weighting when selecting the nearest visually similar content items. It should be appreciated that instead of a dot product comparison, any distance metric could be used to determine distance between the different types of feature descriptors, such as determining the Euclidian distance between the feature descriptors.

After the similarity scores are determined, a set of nearest image descriptors may be selected. For example, the search module may select a subset of image descriptors associated with images of the collection that are nearest the query image descriptors as determined by the combined similarity scores. Images in the collection associated with the subset of nearest feature descriptors may be provided for analysis and/or presentation. For example, the search module may determine images in the collection that match the set of nearest content feature descriptors and provide at least reference to the matching images. As mentioned, in various embodiments the references can be used with a recommendations component 918 to generate recommendations for a user based on information known or obtainable with respect to the items for the matching images.

In some embodiments, the confidence score can be used to determine whether to filter results and/or present one or more filter options to a user. If the confidence score indicates a high object affinity (e.g., a high likelihood that a particular object is depicted in the image) then the matching images can be filtered using the corresponding object. For example, as described above the confidence score may be normalized between 0 and 1. If an image is analyzed and it is determined that the image depicts a representation of a cup with a confidence score above a threshold (e.g., greater than 0.9), then a filter may be applied related to images that also include cups. For example, the filter may exclude any images that do not include cup metadata (e.g., a descriptor indicating that the image includes a representation of a cup). Additionally, or alternatively, the filter may cause the results to be sorted to show images that include representations of cups at a higher position than images that show representations of mugs or other cup-like objects. In some embodiments, the filter can be applied to the set of visually similar images. In some embodiments, the filter can be applied to a category of content items being viewed by a user. For example, if a user if browsing artwork, then all artwork images may be filtered based on the recognized object. Such filers may be applied automatically or may be presented as selectable options to the user. For example, a selectable icon may be displayed which indicates that will cause a set of images to be filtered based on a corresponding object. In some embodiments, different threshold values may be associated with different filtering actions. For example, a very high confidence score (such as a score that is greater than 0.95) may cause the results to be automatically filtered, whereas a lower confidence score, such as 0.75 or 0.8, may cause the filter option to be displayed to the user.

In some embodiments, the weight values determined above based on the confidence score and/or similarity scores can be modified by a user. For example, a user interface can be displayed that provides one or more selectable objects (such as sliders, text boxes, or other visual elements) with which the user may interact to change the weightings. In some embodiments, default weightings can be applied based on a user profile. For example, a user can define default weightings for different types of content items or default weightings may be set automatically based on user search history, user purchase history, or history of weighting adjustments.

In this example, a request is received to a network interface layer 910 of the content provider environment 908. The network interface layer can include any appropriate components known or used to receive requests from across a network, such as may include one or more application programming interfaces (APIs) or other such interfaces for receiving such requests. The network interface layer 910 might be owned and operated by the provider, or leveraged by the provider as part of a shared resource or "cloud" offering. The network interface layer can receive and analyze the request from the client device 902, and cause at least a portion of the information in the request to be directed to an appropriate system or service, such as a content server 912 (e.g., a Web server or application server), among other such options. In the case of webpages, for example, at least one server 912 might be used to generate code and send content for rendering the requested Web page. In cases where processing is to be performed, such as to generate search results, perform an operation on a user input, verify information for the request, etc., information might also be directed to at least other server for processing. The servers or other components of the environment might access one or more data stores, such as a user data store 916 that contains information about the various users, and one or more content repositories 914 storing content able to be served to those users.

As mentioned, in at least some embodiments the content to be provided can include data 920 for one or more recommendations, or other such elements that are selected based on information for the user associated with the request, for example by providing information to a recommendation engine 918 or other such component or service, for analyzing the provided information and attempting to generate recommendations or other elements as discussed herein. In some embodiments, this can utilize content generated within the content provider environment 908 or received from one or more third party providers 906, among other such options. For example, a collection of images can be generated using images captured within the environment or received from the third party providers 906.

Figure 10:
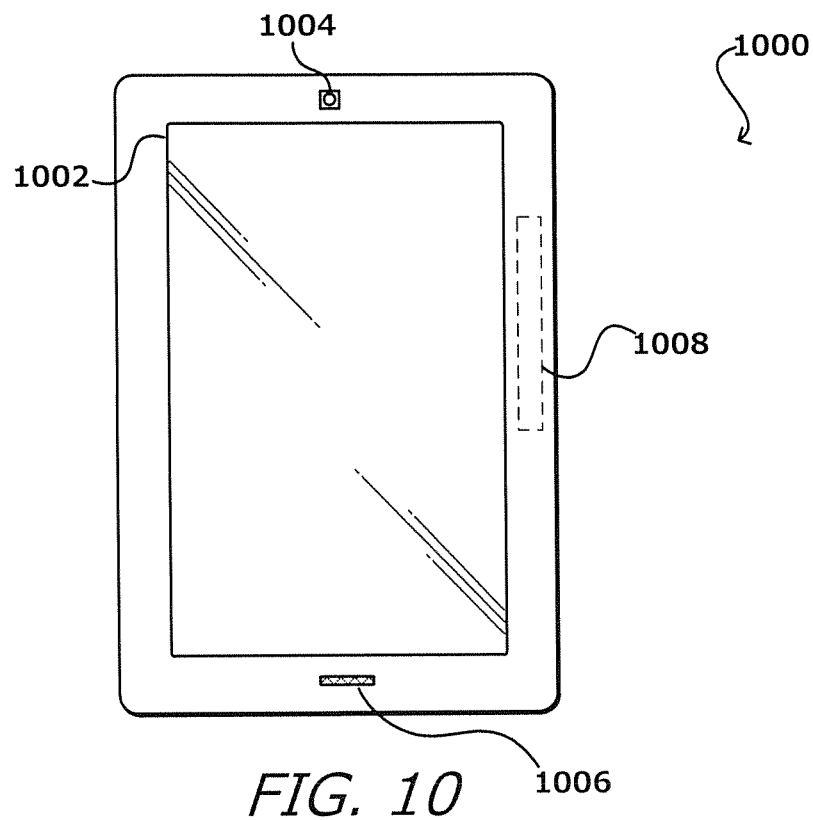
FIG. 10 illustrates an example device that can be used to implement aspects of the various embodiments.

FIG. 10 illustrates an example electronic user device 1000 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 1000 has a display screen 1002 on the front side, which under normal operation will display information to a user facing the display screen (e.g., on the same side of the computing device as the display screen). The computing device in this example includes at least one camera 1004 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 1000 also includes at least one microphone 1006 or other audio capture device capable of capturing audio data, such as words or commands spoken by a user of the device, or ambient audio such as music being played in the vicinity of the device. In this example, a microphone 1006 is placed on the same side of the device as the display screen 1002, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 1000 also includes at least one orientation sensor 1008, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 11:
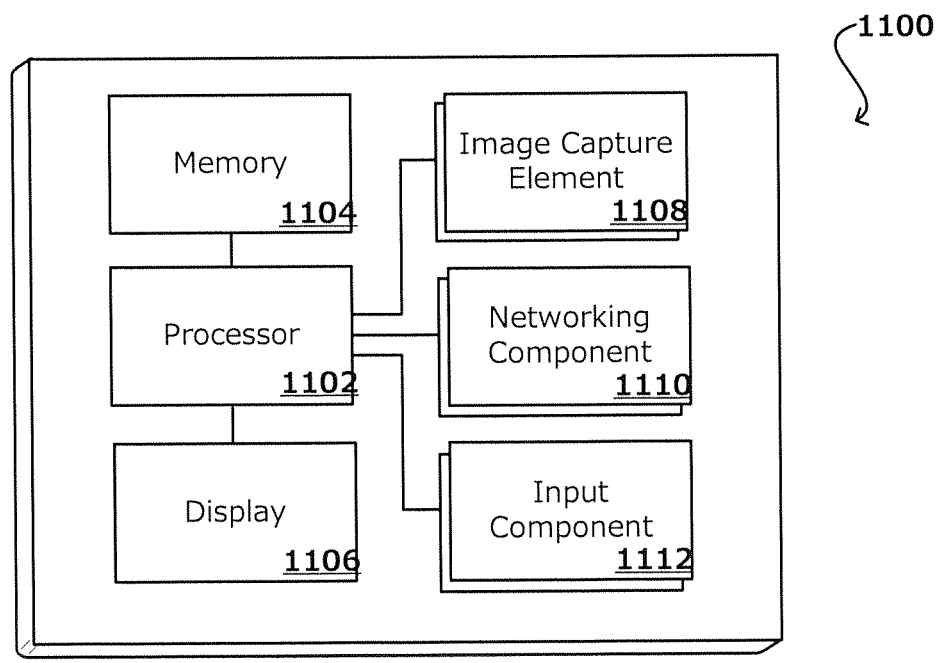
FIG. 11 illustrates an example set of basic components of a computing device, such as the device described with respect to FIG. 10.

FIG. 11 illustrates a logical arrangement of a set of general components of an example computing device 1100 such as the device 1000 described with respect to FIG. 10. In this example, the device includes a processor 1102 for executing instructions that can be stored in a memory device or element 1104. As would be apparent to one of ordinary skill in the art, the device can include many types of memory, data storage, or non-transitory computer-readable storage media, such as a first data storage for program instructions for execution by the processor 1102, a separate storage for images or data, a removable memory for sharing information with other devices, etc. The device typically will include some type of display element 1106, such as a touch screen or liquid crystal display (LCD), although devices such as portable media players might convey information via other means, such as through audio speakers. As discussed, the device in many embodiments will include at least one image capture element 1108 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component, such as a mono or stereo microphone or microphone array, operable to capture audio information from at least one primary direction. A microphone can be a uni- or omni-directional microphone as known for such devices.

In some embodiments, the computing device 1100 of FIG. 11 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input component 1112 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 1100 also can include at least one orientation or motion sensor or component 1110. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 1102, whereby the device can perform any of a number of actions described or suggested herein.

As an example, a computing device such as that described with respect to FIG. 10 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 12:
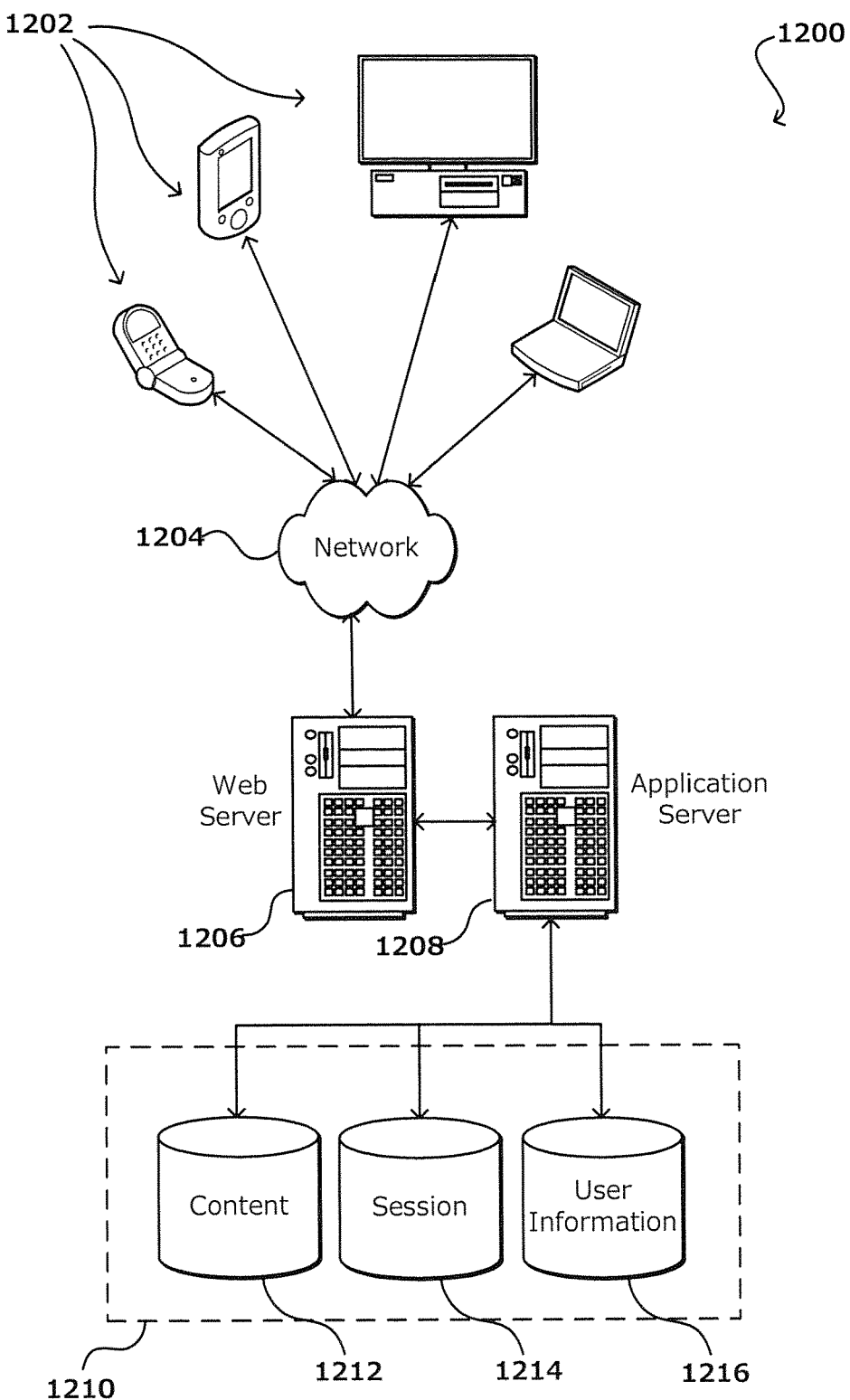
FIG. 12 illustrates an example environment in which various embodiments can be implemented.

As discussed, different approaches can be implemented in various environments in accordance with the described embodiments. For example, FIG. 12 illustrates an example of an environment 1200 for implementing aspects in accordance with various embodiments. As will be appreciated, although a Web-based environment is used for purposes of explanation, different environments may be used, as appropriate, to implement various embodiments. The system includes an electronic client device 1202, which can include any appropriate device operable to send and receive requests, messages or information over an appropriate network 1204 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1206 for receiving requests and serving content in response thereto, although for other networks an alternative device serving a similar purpose could be used, as would be apparent to one of ordinary skill in the art.

The illustrative environment includes at least one application server 1208 and a data store 1210. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 1202 and the application server 1208, can be handled by the Web server 1206. It should be understood that the Web and application servers are not required and are merely example components, as structured code discussed herein can be executed on any appropriate device or host machine as discussed elsewhere herein.

The data store 1210 can include several separate data tables, databases or other data storage mechanisms and media for storing data relating to a particular aspect. For example, the data store illustrated includes mechanisms for storing production data 1212 and user information 1216, which can be used to serve content for the production side. The data store also is shown to include a mechanism for storing log or session data 1214. It should be understood that there can be many other aspects that may need to be stored in the data store, such as page image information and access rights information, which can be stored in any of the above listed mechanisms as appropriate or in additional mechanisms in the data store 1210. The data store 1210 is operable, through logic associated therewith, to receive instructions from the application server 1208 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 1202. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 12. Thus, the depiction of the system 1200 in FIG. 12 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, FTP, UPnP, NFS, and CIFS. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including non-transitory computer-readable storage media, such as but not limited to volatile and non-volatile, removable and non-removable media implemented in any method or technology for storage of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method, comprising:
    receiving, from a computing device, an image and image capture data associated with the image;
    using a trained neural network to identify a plurality of image descriptors corresponding to one or more determined characteristics of the image, based at least on a comparison of the image to a set of stored image descriptors;
    causing a first query including a first set of image descriptors of the plurality of image descriptors to be executed against a set of music descriptors, wherein each of the set of music descriptors is associated with one or more songs available to the computing device;
    determining a song mapping between the first set of image descriptors and the set of music descriptors;
    generating a playlist of songs based on the song mapping, wherein the songs in the playlist of songs are associated with a music descriptor corresponding to the first set of image descriptors;
    causing the playlist of songs to be transmitted to the computing device;
    causing a second query including a second set of image descriptors of the plurality of image descriptors to be executed against a set of stored images associated with a user of the computing device;
    determining an image mapping between the second set of image descriptors and a third set of image descriptors, each of the third set of image descriptors being associated with one or more images of the set of stored images;
    causing an identification of the one or more images of the set of stored images based on the second query and the image mapping;
    causing the identification to be transmitted to the computing device; and
    causing the one or more images of the set of stored images to be displayed while the playlist of songs is being played.

2. The computer-implemented method of claim 1, further comprising:
    determining a duration of the playlist;
    determining an interval of time between display each of the identified stored images associated with the user of the computing device while the playlist of songs is being played;
    determining, based on the interval of time and a quantity of the identified stored images associated with the user of the computing device, that the identified stored images associated with the user of the computing device will be displayed over a threshold number of times over the duration of the playlist;
    determining a third mapping between the second set of image and a fourth set of image descriptors, each of the fourth set of image descriptors being associated with one or more images included in a third-party store of images; and
    causing the one or more images included in the third-party store of images to be displayed on the computing device while the playlist of songs is being played.

3. The computer-implemented method of claim 1, further comprising:
    obtaining a data set including identified image descriptors for each of a plurality of training images, respective identified image descriptors relating to an identified region of interest in a corresponding training image of the plurality of training images; and
    training a neural network using the identified image descriptors and corresponding training image, the neural network configured to determine at least one identified image descriptor associated with an identified region of interest in a query image.

4. A computer-implemented method, comprising:
    receiving, from a computing device, an image;
    using a trained neural network to generate classifier data associated with the image;
    assigning one or more first image descriptors to the image based at least on the classifier data;
    identifying a set of songs available to the computing device, wherein each of the set of songs is associated with one or more song descriptors;
    determining a correlation between the one or more first image descriptors and the one or more song descriptors;
    generating a playlist comprising one or more of the set of songs based at least on the correlation;
    causing the playlist of songs to be transmitted to the computing device for playback;
    determining a set of images associated with a user of the computing device, wherein each image of the set of images is associated with one or more second image descriptors;
    determining a set of mappings between at least one of the one or more first image descriptors and the second image descriptors, each mapping of the set of mappings being between a first image descriptor and a second image descriptor and having a similarity score;
    generating a first subset of images in the set of images, each respective image of the first subset of images being associated with a second image descriptor of the set of mappings that has a similarity score above a threshold value;
    causing an identification of the first subset of images to be transmitted to the computing device; and
    causing the first subset of images to be displayed on the computing device while the playlist of songs is being played.

5. The computer-implemented method of claim 4, wherein the one or more second image descriptors comprise face data, and further comprising:
- identifying a face represented in one of the set of images based on the face data;
- identifying a second subset of images in the set of images, each image of the second subset of images being associated with a second image descriptor including face data matching the identified face;
- causing an identification of the second subset of images to be transmitted to the computing device; and
- causing the second subset of images to be displayed on the computing device along with the first subset of images.

6. The computer-implemented method of claim 4, further comprising:
- analyzing the image to obtain scene data;
- identifying one or more songs of the set of songs available to the computing device that have been included in a third party playlist generated on behalf of a third party in response to receiving similar scene data;
- causing an identification of the identified one or more songs to be transmitted to the computing device; and
- causing the identified one or more songs to be added to the playlist of songs.

7. The computer-implemented method of claim 4, further comprising:
- determining that the all images in the first subset of images will have been displayed after a first duration, wherein each image in the first subset of images is displayed on the computing device for a first amount of time before a subsequent image in the first subset is subsequently displayed;
- determining that the playlist of songs has a second duration;
- determining that the first duration is less than the second duration by a threshold amount; and
- reducing the threshold value to an amount such that the first subset of images contains an amount of images sufficient to be displayed for a third duration, the third duration being within the threshold amount of the second duration.

8. The computer-implemented method of claim 4, further comprising:
- determining that the all images in the first subset of images will have been displayed after a first duration, wherein each image in the first subset of images is displayed on the computing device for a first amount of time before a subsequent image in the first subset is subsequently displayed;
- determining that the playlist of songs has a second duration;
- determining that the first duration is less than the second duration by a threshold amount; and
- determining a third party set of images to add to the first subset of images, wherein each image of the third party set of images is associated with one or more of the first image descriptors.

9. The computer-implemented method of claim 4, further comprising:
- receiving location data associated with the image;
- identifying, for the set of songs available to the computing device, a song of the set of songs associated with playback location data, wherein the playback location data identifies a location at which the song was played within a threshold amount of time;
- determining a correlation between the location data associated with the image and the playback location data associated with the song; and
- causing the song to be added to the playlist of songs at the computing device.

10. The computer-implemented method of claim 9, further comprising:
- determining, based on the location data and time data associated with the image, weather data;
- determining a second correlation between the image descriptors and the weather data;
- determining a second song of the set of songs based on the second correlation; and
- causing the second song to be added to the playlist of songs at the computing device.

11. The computer-implemented method of claim 4, further comprising:
- obtaining a data set including identified image descriptors for each of a plurality of training images, respective identified image descriptors relating to an identified region of interest in a corresponding training image of the plurality of training images; and
- training a classifier using the identified image descriptors and corresponding training image, the classifier configured to determine at least one identified image descriptor associated with an identified region of interest in a query image.

12. The computer-implemented method of claim 11, wherein training the classifier includes utilizing at least one machine learning algorithm, wherein the machine learning algorithm is based on one of a principal component analysis (PCA) algorithm, a neural network, a support vector machine, an inductive learning algorithm, a decision tree algorithm, a random forest algorithm, an adaptive boosting algorithm, or a deep learning algorithm.

13. A system, comprising:
- at least one processor; and
- memory including instructions that, when executed by the at least one processor, enable the system to:
  - receive, from a computing device, an image;
  - using a trained neural network to generate classifier data associated with the image;
  - assign one or more first image descriptors to the image based at least on classifier data;
  - identify a set of songs available to the computing device, wherein each of the set of songs is associated with one or more song descriptors;
  - determine a correlation between the one or more first image descriptors and the one or more song descriptors;
  - generate a playlist comprising one or more of the set of songs based at least on the correlation;
  - cause the playlist of songs to be transmitted to the computing device for playback;
  - determine a set of images associated with a user of the computing device, wherein each image of the set of images is associated with one or more second image descriptors;
  - determine a set of mappings between at least one of the first image descriptors and at least one of the second image descriptors, each mapping between a first image descriptor and a second image descriptor of the set of mappings having a similarity score;
  - generate a first subset of images in the set of images, each respective image of the first subset of images being associated with a second image descriptor of the set of mappings that has a similarity score above a threshold value;
cause an identification of the first subset of images to be transmitted to the computing device; and
cause the first subset of images to be displayed on the computing device while the playlist of songs is being played.

14. The system of claim 13, wherein the one or more second image descriptors comprise face data, and wherein the instructions when executed further enable the system to:
identify a face represented in one of the set of images based on the face data;
identify a second subset of images in the set of images, each image of the second subset of images being associated with a second image descriptor including face data matching the identified face;
cause an identification of the second subset of images to be transmitted to the computing device; and
cause the second subset of images to be displayed on the computing device along with the first subset of images.

15. The system of claim 13, wherein the instructions when executed further enable the system to:
analyze the image to obtain scene data;
identify one or more songs of the set of songs available to the computing device that have been included in a third party playlist generated on behalf of a third party in response to receiving similar scene data;
cause an identification of the identified one or more songs to be transmitted to the computing device; and
cause the identified one or more songs to be added to the playlist of songs.

16. The system of claim 13, wherein the instructions when executed further enable the system to:
determine that the all images in the first subset of images will have been displayed after a first duration, wherein each image in the first subset of images is displayed on the computing device for a first amount of time before a subsequent image in the first subset is subsequently displayed;
determine that the playlist of songs has a second duration;
determine that the first duration is less than the second duration by a threshold amount; and
reduce the threshold value to an amount such that the first subset of images contains an amount of images sufficient to be displayed for a third duration, the third duration being within the threshold amount of the second duration.

17. The system of claim 13, wherein the instructions when executed further enable the system to:
determining that the all images in the first subset of images will have been displayed after a first duration, wherein each image in the first subset of images is displayed on the computing device for a first amount of time before a subsequent image in the first subset is subsequently displayed;
determining that the playlist of songs has a second duration;
determining that the first duration is less than the second duration by a threshold amount; and
determining a third party set of images to add to the first subset of images, wherein each image of the third party set of images is associated with one or more of the first image descriptors.

* * * * *